US007768525B2

(12) United States Patent
Hsu

(10) Patent No.: US 7,768,525 B2
(45) Date of Patent: Aug. 3, 2010

(54) DYNAMIC PAINT PICKUP
(75) Inventor: Siu Chi Hsu, Hong Kong (CN)
(73) Assignee: Microsoft Corporation, Redmond, WA (US)
(*) Notice: Subject to any disclaimer, the term of this patent is extended or adjusted under 35 U.S.C. 154(b) by 659 days.
(21) Appl. No.: 11/419,074
(22) Filed: May 18, 2006
(65) Prior Publication Data
US 2007/0268302 A1 Nov. 22, 2007
(51) Int. Cl.
G09G 5/02 (2006.01)
(52) U.S. Cl. .................. 345/593; 345/581; 345/589; 345/591; 345/592; 345/594; 345/634; 382/167; 382/283; 715/810; 715/835
(58) Field of Classification Search ................ None
See application file for complete search history.
(56) References Cited

U.S. PATENT DOCUMENTS

| 6,226,000 | B1 * | 5/2001 | Richens et al. | 345/419 |
| 6,791,573 | B2 * | 9/2004 | Hamburg | 345/619 |
| 7,046,403 | B1 * | 5/2006 | Yhann | 358/518 |
| 7,215,813 | B2 * | 5/2007 | Graves et al. | 382/167 |

OTHER PUBLICATIONS

Corel, Inc., "Corel Painter IX.5 Feature Focus: Artist' Oil Painting System", Retrieved from <<http//apps.corel.com/painterix/product/feature_focus.html>>, (Jan. 1, 2007), p. 1.
Sutton, Jeremy "Create Intense Colored Strokes with the Oils Brush in Corel Painter", Retrieved from <<http://www.graphics.com/modules.php?name=Sections&op=viewarticle&artid=319>>, (Jan. 18, 2006),pp. 1-2.
Bradley, Helen "Choose the Right Tool for Every Job in Photoshop CS2: Selecting the Color Range Tool", Retrieved from <<http://www.adobepress.com/articles/article.asp?p=427228&seqNum=5>>, (Nov. 15, 2005),pp. 1-2.
WWW.HUMANSOFTWARE.COM, "Brush Easily Photo-Realistic Effect: Photospray", Retrieved from <<http://www.humansoftware.com/pages1200/Photospray/HSpsp1111.html>>, (Dec. 1, 2007),p. 1.

* cited by examiner

Primary Examiner—Antonio A Caschera

(57) ABSTRACT

A color attribute picked up from a pickup surface of a graphics design application document may be used to contaminate a paint data store. An injection color attribute may be re-injected into the paint data store. The resulting contaminated and re-injected paint data store may be used to tint one or more stamps in a stroke drawn on a target surface of the document. Thus, a color attribute of an existing pixel may be sampled and combined with an injection color attribute, such that the color attribute data applied by a graphics data manipulation tool is dynamic over the stroke of the graphics data manipulation tool in response to the picked-up color attributes and the injection color attributes.

18 Claims, 29 Drawing Sheets

DYNAMIC PAINT PICKUP

BACKGROUND

Producers of graphic content for display using a computer system want to create rich graphic contents which can be manipulated for different uses. Graphic contents may be represented as pixel data, possibly in layers, in the form of a bitmap image. Pixel data are collections of one or more pixels, which are samples of color and/or other information including transparency, thickness etc. An example of pixel data is a digital photograph, with a fixed resolution.

Many electronic graphics design applications allow a user to create pixel data with a pixel data manipulation tool, such as a brush, with one or more color attributes. One or more of the color attributes applied by the pixel data manipulation tool may be sampled from the color attributes of existing pixel data. Additionally or alternatively, the color attributes may be set using a displayed color attribute user interface device, such as a palette. After creation by a pixel data manipulation tool, attributes of pixel data may be modified, such as with a filter, smudge tool, blur tool, or any other suitable pixel data manipulation tool.

In a typical smudge tool of an electronic graphics design application, a stamp mask may be used to copy the current target surface into a pickup buffer, as a pickup step. As the smudge tool user device applicator is moved, the next stamp position is determined and the pickup buffer is copied onto the target surface at the new stamp position, as a transfer or 'ghosting' step. The current stamp mask is then used to copy back the resulting target surface into the pickup buffer, as a pickup step. This process may be repeated as the smudge tool is 'drawn' across the digital target surface to create a digital effect of moving a finger or brush across wet paint. In some cases, an initial injection of a user defined color may be applied at the first stamp position.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Creating a graphics design with an electronic graphics design application may require the creation of pixel data of different attributes, such as color. For pixel data, a graphics data manipulation tool may be a pixel data manipulation tool, and for vector object data, as a collection of pixels defined by analytical information, the graphics data manipulation tool may be a vector object manipulation tool. Typical graphics design applications allow existing color attribute information to be sampled from only one pixel to 'load' a pixel data manipulation tool such as a brush. Thereafter, the pixel data manipulation tool 'paints' onto the digital surface with that one selected color. Thus, typical pixel data manipulation tool paint pick up is static. Dynamic paint loading of a tool is typically done with a smudge or blur tool, but the resulting brush paints solely with the colors underlying the tool and possibly an injection of color at the first stamp.

In order to create graphics designs with a less mechanical appearance, it is often desirable to introduce one or more new color attributes while combining with colors proximate the user device graphics data manipulation tool applicator. Thus, one or more color attributes of an existing pixel may be sampled proximate the graphics data manipulation tool user interface applicator (such as a mouse icon, stylus location, etc.). The color attribute data of a pixel applied by the graphics data manipulation tool may be based, at least in part, on the sampled color attribute data and combined with a pre-defined color attribute, such as a pre-loaded color defined by a user interface device such as a color palette or dialog box. Moreover, in some applications, the sampled pixel color attribute data may be re-sampled and combined with a color attribute of a pixel. The newly combined color attribute based on the newly sampled and re-injected pre-defined color attribute may be applied at the next stamp location as a stroke trail is 'drawn' on the digital surface. In this manner, the pixel color attribute data applied by the graphics data manipulation tool to a pixel may be dynamic over the stroke of the graphics data manipulation tool as well as contain a re-injection of the pre-defined color attribute. In this manner, the graphics data manipulation tool may be loaded with pre-defined color, which may be static or dynamic, and loaded with dynamic sampling of the color attribute data of the existing graphics data proximate the user interface applicator of the graphics data manipulation tool. The pre-defined color and the sampled color may be combined in any suitable manner.

In some cases, the proximate graphics data providing the sampled color attribute information may be graphics data in the same layer. In other cases, the proximate graphics data may be in one or more other layers forming an indicated pickup surface, and may include one or more of the target or current active layer, the layer directly beneath the current layer, a designated layer, and the like.

In some cases, the mask used to pickup and/or apply color may change from one stamp to the next stamp in the stroke. In some cases the pickup of color may be based on a mask of the graphics data manipulation tool or may be independent of the mask of the graphics data manipulation tool.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a graphics design system, the system described is provided as an example and not a limitation. As those skilled in the art will appreciate, the present examples are suitable for application in a variety of different types of object editing systems.

Figure 1:
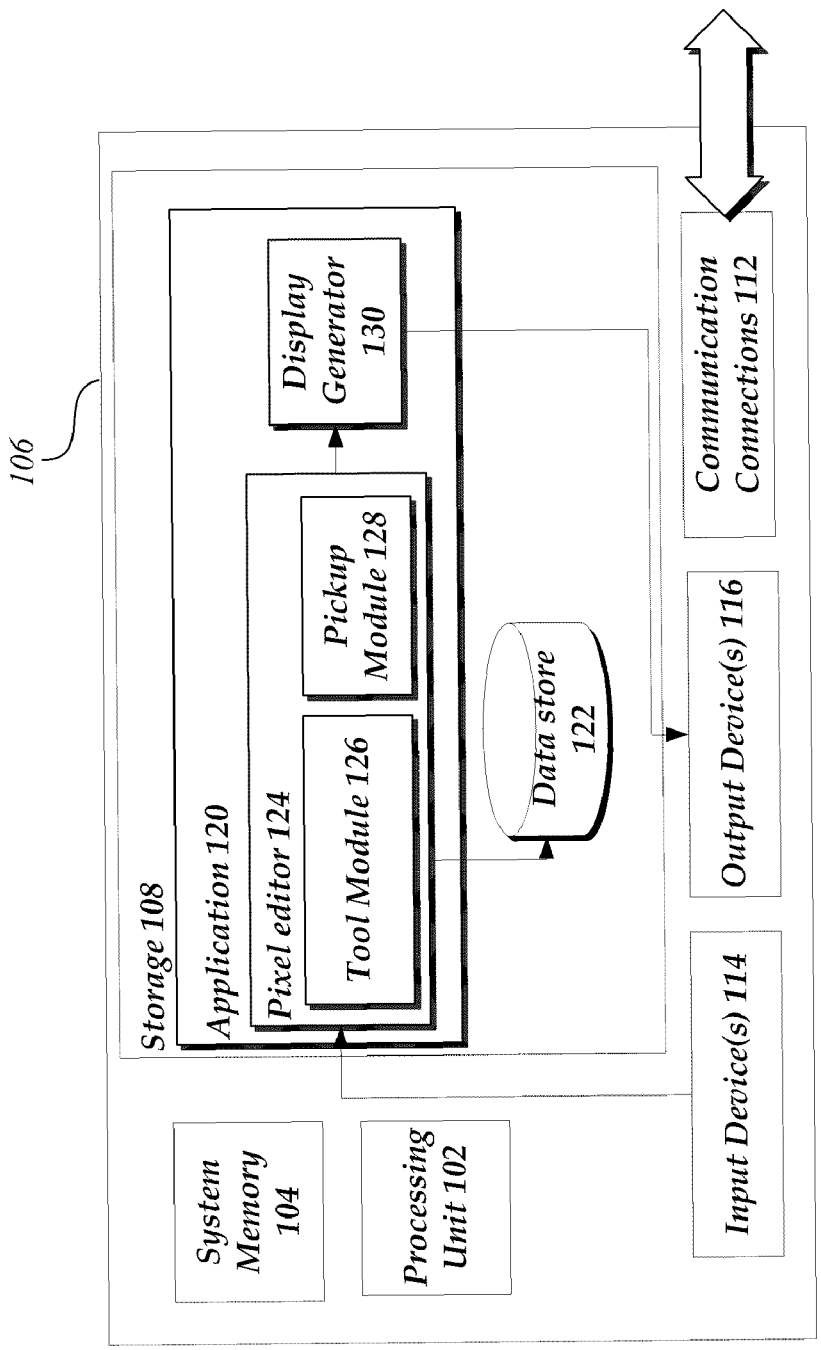
FIG. 1 is a block diagram of an example computing system for a graphics design system.

FIG. 1 and the following discussion are intended to provide a brief, general description of a graphics design system. As shown in FIG. 1, a graphics design system may be provided by one or more computing devices 106. Computing device 106 of FIG. 1 and the following discussion are intended to provide a brief, general description of a suitable computing environment in which all or a portion of a graphics design system may be implemented. The operating environment of the computing device 106 of FIG. 1 is only one example of a suitable operating environment and is not intended to suggest any limitation as to the scope of use or functionality of the operating environment. Other well known computing systems, environments, and/or configurations that may be suitable for use with a graphics design system described herein, include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

In its most basic configuration, computing device 106 typically includes at least one processing unit 102 and memory 104. Depending on the exact configuration and type of computing device, memory 104 may be volatile (such as RAM), non-volatile (such as ROM, flash memory, etc.) or some combination of the two.

Additionally, device 106 may also have additional features and/or functionality. For example, device 106 may also include additional storage 108 (e.g., removable and/or non-removable). Computer storage media includes volatile and nonvolatile, removable and non-removable media implemented in any method or technology for storage of information such as computer readable instructions, data structures, program modules, or other data. Memory 104 and storage 108 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 106. Any such computer storage media may be part of memory 104 and/or storage 108.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Device 106 may contain one or more communication connection(s) 112 that allow the device 106 to communicate with other devices, such as with other computing devices through a network (not shown). Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 106 may have one or more input device(s) 114 such as keyboard, mouse, pen, stylus, voice input device, touch input device, laser range finder, infra-red cameras, video input devices, and/or any other input device. Output device(s) 116 such as one or more displays, speakers, printers, and/or any other output device may be included.

Although not required, the graphics design system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

The computing device 106 of the graphics design system may include one or more modules stored in any suitable manner, such as in the memory 104 and/or in the storage 108. As shown in the example of FIG. 1, the storage 108 may contain (or contain a reference to) modules for implementing the graphics design system such as a graphics design application 120 and a data store 122.

In the example of FIG. 1, the graphics design system may provide a pixel editor 124, tool module 126, pickup module 128, and display generator 130. Although separate components are provided for the pixel editor, tool module, pickup module, and display engine, it is to be appreciated that the graphics design application may provide any number of components in any format to provide the functionality discussed herein.

The pixel editor 124 provides an environment for manipulation of graphics data. For example, the pixel editor may provide a manipulation frame for framing a workspace. Graphics data may be manipulated (e.g., created or modified) in the workspace such as by manipulation of one or more graphics data manipulation tools provided by the tool module 126. Although the following examples are directed toward a pixel data manipulation tool, it is to be appreciated that the pixel editor, manipulation tools, and the like may also or alternatively be used to manipulate other types of graphics data, such as vector data, in a manner similar to that described.

The pixel editor 124 may communicate the environment information and generated pixel data information to the display generator 130 to be displayed to the user through the output device 116, and to accept input for pixel data manipulation from the user through the input device 114. For example with reference to the example display 200 of FIG. 2, the pixel editor 124 may provide a frame 202 with a workspace 204 for creation and/or modification (i.e., manipulation) of pixel data. The pixel data generated within the frame and/or pixel information regarding tools may be stored in any suitable manner, such as in a data store 122 shown in FIG. 1.

Figure 2:
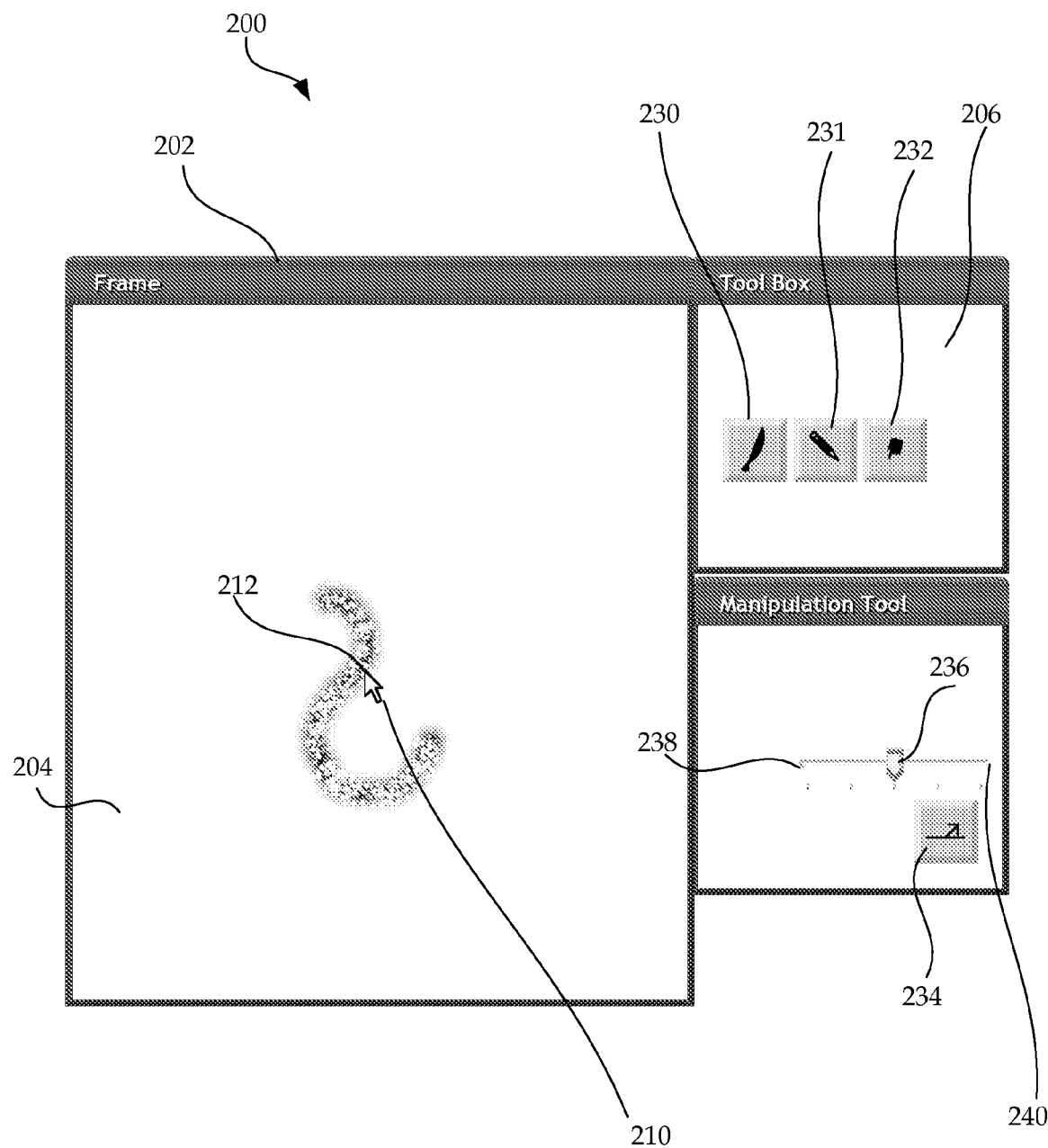
FIG. 2 is an example display of a graphics design application with existing pixel data.

To allow manipulation (e.g., creation and/or modification) of pixel data in the graphics design application, the pixel editor 124 through the tool module 126 may provide one or more tools such by displaying a tool box, tool bar, menu, palette, and the like through the display generator 130. For example, in the example display 200 of FIG. 2, the pixel editor provides through the display generator a pixel data tool box 206 containing one or more tools for manipulating pixel data. Any number and kind of tools and/or functionalities may be provided to manipulate pixel data such as pixel brush tool activated by paint brush indicator 230, pencil tool activated by pencil tool indicator 231, smudge tool activated by smudge tool indicator 232, etc. The pixel brush tool may paint pixels along a trail having a color attribute defined by a palette. The pencil tool may provide pixel level detail which may be through a block brush and/or no anti-aliasing, and one or more of the color attributes may be controlled through a color palette. The smudge tool may 'smear' existing pixels using a brush type defined by a paint style palette or brush list. Although a brush tool, pencil tool, and smudge tool are illustrated in FIG. 2, it is to be appreciated that any number and type of graphics data manipulation tools may be provided as appropriate.

The pickup module 128 may determine one or more color attributes of an indicated pickup pixel in a pickup surface. The pickup surface may be any one or more of the current active or target paint surface, a layer underlying the target paint surface, or any other layer. The pickup surface may be indicated by default or may be indicated by the user in any suitable manner through any suitable user interface device such as a menu selection, pickup button, text box, etc.

In some cases, the pixel data manipulation tool user interface applicator may indicate the pickup pixel. The user interface applicator may be any suitable indicator of the pixel data manipulation tool, such as a mouse icon, a stylus point indicator, and the like. For example, the pickup module 128 of FIG. 1 may determine the location of the user interface applicator 210 shown in the example display of FIG. 2, and determine the one or more color attributes of the pixel 212 indicated by the user interface applicator. The location of the indicated pixel may be determined in any suitable manner. For example, the location of the user interface applicator (e.g., mouse pointer, stylus location, etc.) may be determined using typical user interface techniques. The pixel most proximate to the location of the user interface applicator may be determined in any suitable manner, such as a closest position, closest center position of the pixel, and the like. In another example, a stamp location along a trail indicated by the pixel data manipulation tool user interface applicator may indicate one or more pixels as the pickup pixel(s). In some cases, a user or default value may provide a pre-defined off-set such that the pickup pixel providing color attributes is offset from the determined stamp or applicator position.

The color attribute information of the indicated pixel may be determined in any suitable manner. For example, the pickup module may examine the color attribute information associated with the displayed pixel as displayed by the display generator 130 and/or stored in the database 122.

The pickup module may determine color attributes for one or a plurality of pickup pixels. For example, a pickup mask may be used to determine the plurality of pixels proximate the user interface applicator or stamp location. The pickup mask may be the same as or different than the painting mask used by the pixel data manipulation tool associated with the user interface applicator, and may be user defined, a default mask, determined based on one or more masks, and the like.

Figure 3:
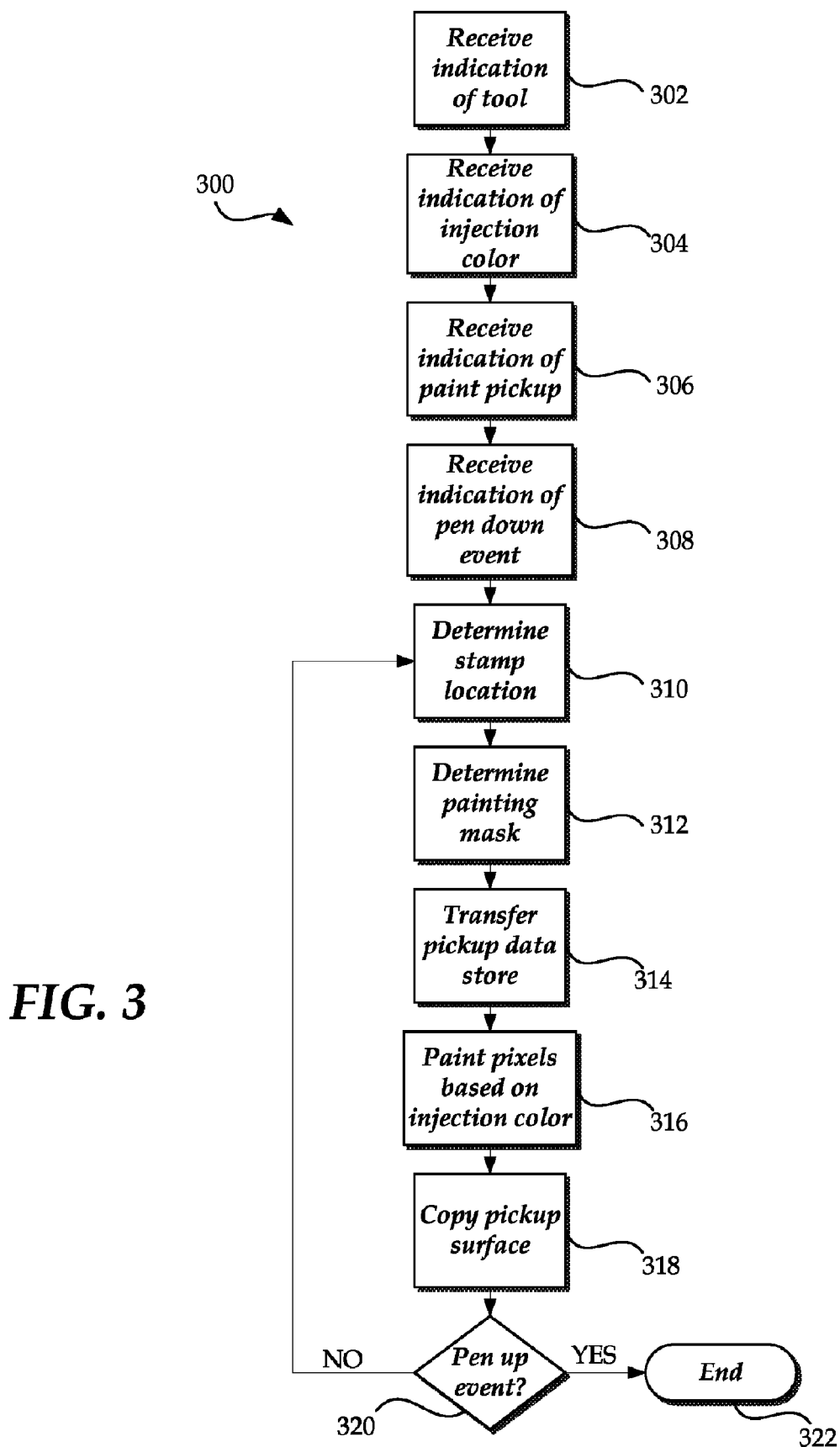
FIG. 3 is a flow chart of an example dynamic paint pick up method.

One method of allowing dynamic paint pickup is illustrated in the example method 300 of FIG. 3. A user may select a pixel data manipulation tool, such as the paint brush, pencil tool, smudge tool. The pixel data manipulation tool may be selected in any suitable manner, such as by selecting from a drop down menu, clicking a tool indicator in a user palette, or any other displayed user interface device. The graphics application (such as the tool module 126 of FIG. 1), in response to selection of the pixel data manipulation tool may receive 302 an indication of the selected pixel data manipulation tool. The graphics design application may receive 304 an indication of a pre-defined injection color attribute in any suitable manner, such as retrieving a default color from the data store or receiving an indication of a selection of a color by the user (such as by selection of a color attribute in a color palette or other suitable displayed user interface device).

Color attributes may be any one or more color properties of a pixel, such as hue, saturation, lightness if a hue-saturation-lightness color model is used. It is to be appreciated that any suitable color model may be used to define the color attributes, such as red-green-blue (RGB), cyan-magenta-yellow-black (CMYK), custom color models, and the like, and the graphics design application may provide multiple available color models. The pre-defined injection color attribute may be stored in a paint data store, such as a paint data buffer, and may be part of the data store 122 or system memory 104 of FIG. 1. The paint data store may be static or dynamic (e.g., the color attribute information to be applied as 'paint' may vary over the length of the stroke).

An indication of dynamic paint pickup may be received 306 in any suitable manner. For example, dynamic paint pickup may be automatically triggered upon selection of a particular pixel data manipulation tool (such as a smudge tool) or may be optionally selected by a user by selecting a displayed user interface device, such as a button, menu selection, dialog box, slider, etc. In the example of FIG. 2, the paint pickup selector may be a button such as pickup selector button 234. Selection of the pickup selector button 234 may indicate to the graphics design application (tool module 126) that the associated pixel data manipulation tool (e.g., the selected pixel brush tool 230) may be loaded with a color as determined dynamically by the pickup module 128 of FIG. 1. Specifically, with the pickup selector activated, the color attributes of one or more pixels indicated by the user interface applicator or stamp location may be dynamically determined by the pickup module as the pixel data manipulation tool is used to 'paint' a stroke trail across the target surface. In this manner, as the user interface applicator is drawn across the digital target surface, the pickup module may 'load' the pixel data manipulation tool with one or more color attributes of the indicated pixels as the applicator is moved across the target surface.

An indication of a pen down event may be received 308. The pen down event may be any suitable event indicating the beginning of a stroke such as placement of a stylus in the displayed workspace, placing the user interface applicator in the workspace and 'clicking and dragging', retrieving a default stroke from memory, and the like.

In response to the pen down event, the graphics design application may determine 310 a location of a stamp. A typical graphics design application, such as through a tools module 126 and display module 130 of FIG. 1, generates the effect of a real-world paint brush with a rubber-stamp process. For example, a mask or template of the brush provides the outline of a single stamp. As the user indicates the stroke trail, a stamp defined by a brush mask is repeatedly applied along the trail and filled with the indicated coloring to create the appearance of a displayed brush stroke. There are also other non-rubber stamp based methods, e.g. a watercolor diffusion simulation or a skeleton based stroking process, for generating the appearance of paint brush strokes on digital surfaces. As used herein, the term stamp indicates a portion of the trail of the brush mask applied proximate the user interface device applicator.

Figure 4:
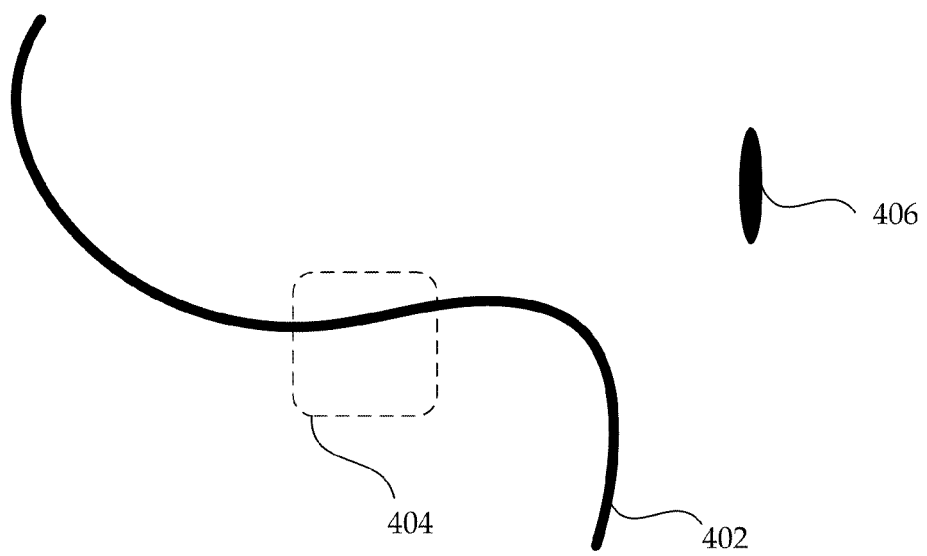
FIG. 4 is a schematic of an example graphics design application and display of a first stamp position of the dynamic paint pickup method of FIG. 3.

The painting mask to be applied at the determined stamp location may be determined 312, such as by the tools module of the graphics design application. The painting mask may be the mask of the indicated pixel data manipulation tool, which may be static or dynamic over the length of a single stroke. The painting mask may be a singular mask or may include a plurality of discontinuous areas. With reference to the schematic diagram of FIG. 4, the display of the workspace of the graphics design application may include existing pixels 402, and the determined stamp location for a new stroke may be determined as location 404. The stamp mask may be the determined painting mask 406, shown in the shape of a vertical ellipse, as the stamp to be applied at that stamp location. The painting mask may be determined in any suitable manner, such as through an algorithm, retrieved from a data store (such as data store 122 of FIG. 1), and the like.

The contents of a pickup data store containing color attribute information may be transferred 314 to the determined stamp location. In the first stamp of a stroke, the pickup data store may be empty, and thus, this step may be skipped or the null or default contents of the pickup data store may be applied to the stamp location using the stamp mask. The entire contents of the pickup data store may be applied or a pickup paint mask may be used. The pickup paint mask may be the same as or different from the painting mask, such as painting mask 406 of FIG. 4

Figure 5:
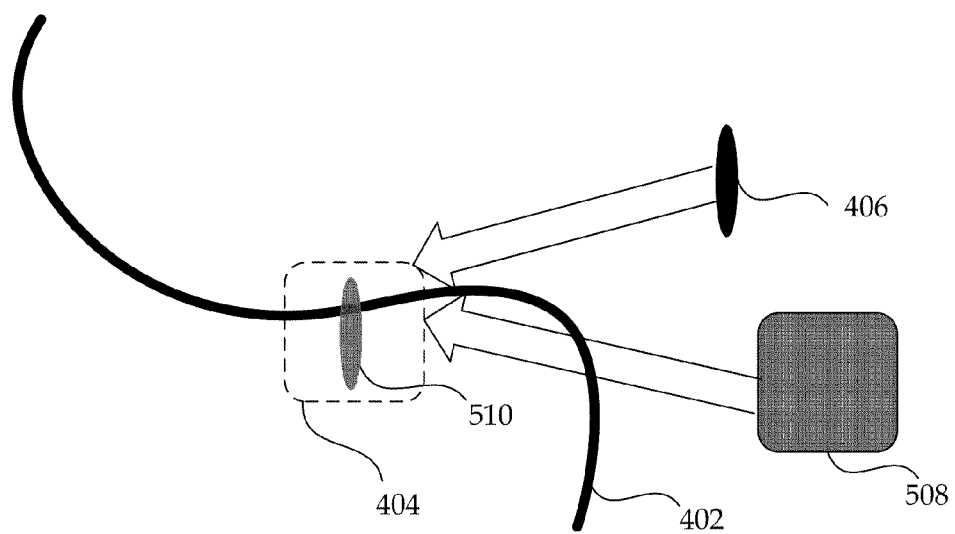
FIG. 5 is a schematic of an example graphics design application and display of painting of the dynamic paint pickup method of FIG. 3.

Using the determined painting mask, one or more pixels may be painted 316 onto the target surface at the determined stamp location having color attributes defined by the injection color attributes and in the shape of the determined painting mask. If the injection color attributes are stored in a paint data store, the color attributes from the paint data store may be used. Referring to the example schematic display of FIG. 5, the painting mask 406 may be combined with the color attributes of the paint data store 508 to paint pixels at the stamp location 404, which is shown as a plurality of semi-transparent pixels 510 in the shape of a vertical ellipse on top of the existing pixels 402.

A pickup mask may be used to pickup one or more pixels proximate the determined stamp position to copy a portion of the pickup surface. The copied pixels may be stored in any suitable manner, such as in a pickup data store, which may be a buffer, part of the data store 122 and/or system memory 104 of FIG. 1, and the like. The pickup mask may be determined in any suitable manner, such as by the pickup module. For example, the pick up mask may be the same mask as the painting mask determined 310 above, the pickup paint mask, or may be independently determined pickup mask, which may be static or dynamic over the length of a single stroke. In this example, the pickup mask is identical to the current painting mask 406 of FIG. 4.

Figure 6:
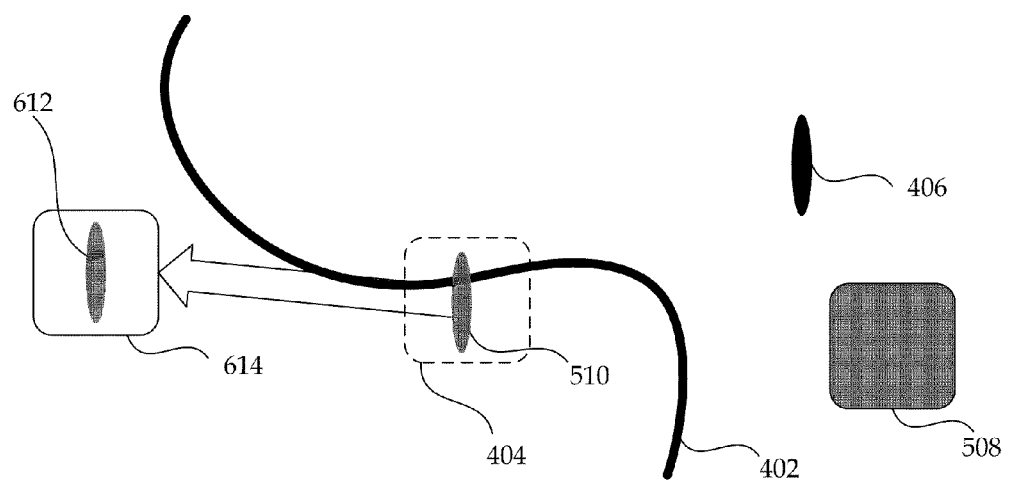
FIG. 6 is a schematic of an example graphics design application and display of a copy back of the dynamic paint pickup method of FIG. 3.

Any suitable method may be used to copy the pickup surface to dynamically pickup paint along the length of a stroke. The color attributes of the pixel(s) indicated by the pickup mask at the stamp location may be determined. The pixel(s) indicated by the pickup mask may be of the same type as the pixel data manipulation tool (i.e., pixel data) or may be of another type of graphics data, such as a displayed pixel of a vector object. The indicated pixel(s) (e.g., defined by the pickup mask) may be within an indicated pickup surface which may be any one or more of the same layer as the target surface currently being painted upon by the pixel data manipulation tool, or may be of another layer, such as a layer lying directly below the current active layer, a layer having displayed graphics data 'under' the stamp location, an indicated layer (e.g., a pickup layer selector may be set or indicated by the user), and the like. As shown in the example schematic display of FIG. 6, the painted pixel 510 and a portion of the existing pixels 402 may be masked by the mask 406 at the determined stamp location 404 to copy pixels 612 to a pickup data store 614. In this example, the pickup surface is indicated by default as the target surface.

Figure 7:
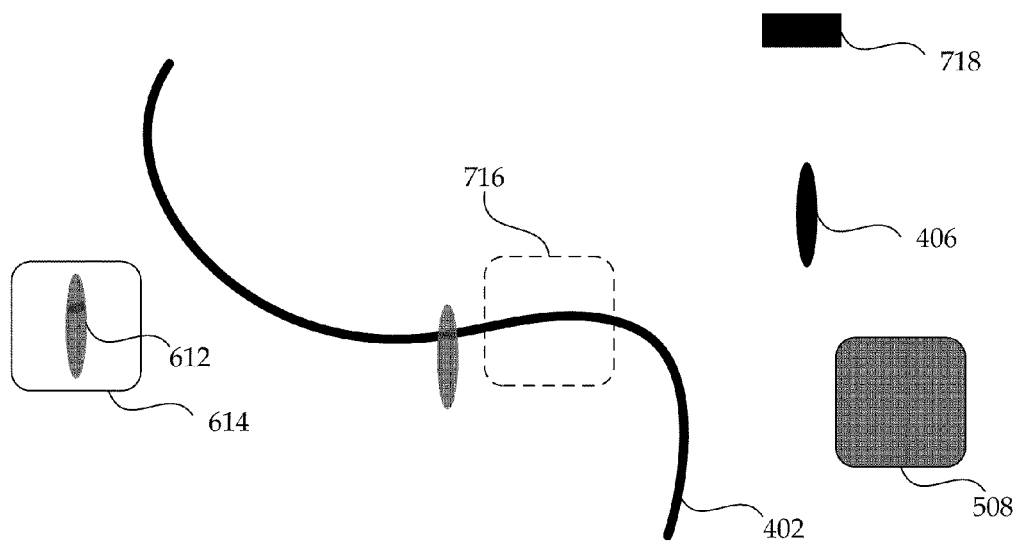
FIG. 7 is a schematic of an example graphics design application and display of a second stamp position of the dynamic paint pickup method of FIG. 3.

If the graphics design application has not received 320 an indication of a pen up event, the method may return to determining 310 the next stamp location, such as when the user moves the user interface device applicator across the digital surface. The painting mask may be determined 312, which may be same as or different than the painting mask determined in the previous stamp. With reference to the example schematic of FIG. 7, the second stamp location 716 may be determined and the second painting mask 718 determined as forming a rectangle.

The contents of the pickup data store containing color attribute information may be transferred 314 to the determined stamp location. In the second and/or subsequent stamps along the stroke, the pickup data store contains the color attributes of the pixels copied from the previous stamp location. With reference to the schematic of FIG. 8, the pixels 612 of the pickup data store 614 may be transferred to the second stamp location 716. The opacity of the pixels in the pickup data store may be optionally scaled down based on a user supplied mixing parameter before being transferred to the second or subsequent stamp location. Such opacity scaling effectively controls the amount of smudging. As noted above, a pickup painting mask may be determined and used in some cases to transfer only a portion of the graphics data of the pickup data store.

Using the determined painting mask, one or more pixels may be painted 316 onto the target surface at the determined stamp location having color attributes defined by the injection color attributes and in the shape of the determined stamp mask. If stored in a paint data store, the color attributes from the paint data store may be used. Referring to the example schematic display of FIG. 9, the painting mask 718 may be combined with the color attributes of the paint data store 508 to paint pixels at the stamp location 716, and is shown as a plurality of semi-transparent pixels 920 in the shape of a rectangle. The paint data store may be static over one or more stamps or may change from one stamp to the next such as updated according to a pre-determined algorithm, etc.

A pickup mask may be used to pickup or copy 318 one or more pixels proximate the indicated stamp position to copy a portion of the pickup surface. The copied pixels may be stored in any suitable manner, such as in the pickup data store. The pickup mask may be determined in any suitable manner, such as by the pickup module. As shown in the example schematic display of FIG. 10, the pickup surface is the displayed target surface and the pickup mask is identical to the current painting mask 718. The painted pixels 920, the transferred pixels 612 from the pickup data store, and a portion of the existing pixels 402 may be masked by the mask 718 at the determined stamp location 716 to copy pixels 1022 to update the pickup data store 1024. If the graphics design application has received 320 an indication of a pen down event, the method may end 322.

Figure 8:
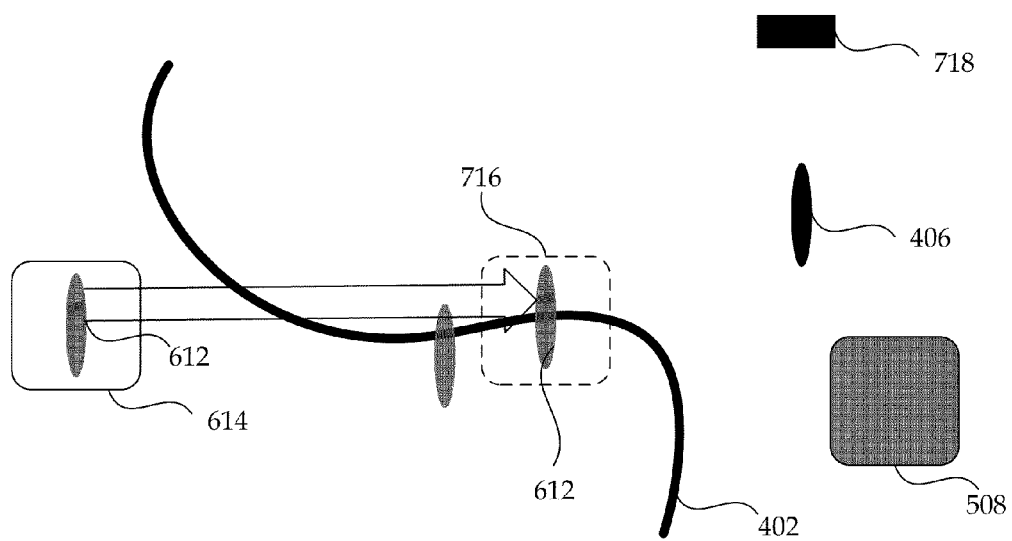
FIG. 8 is a schematic of an example graphics design application and display of a transfer of the dynamic paint pickup method of FIG. 3.
Figure 9:
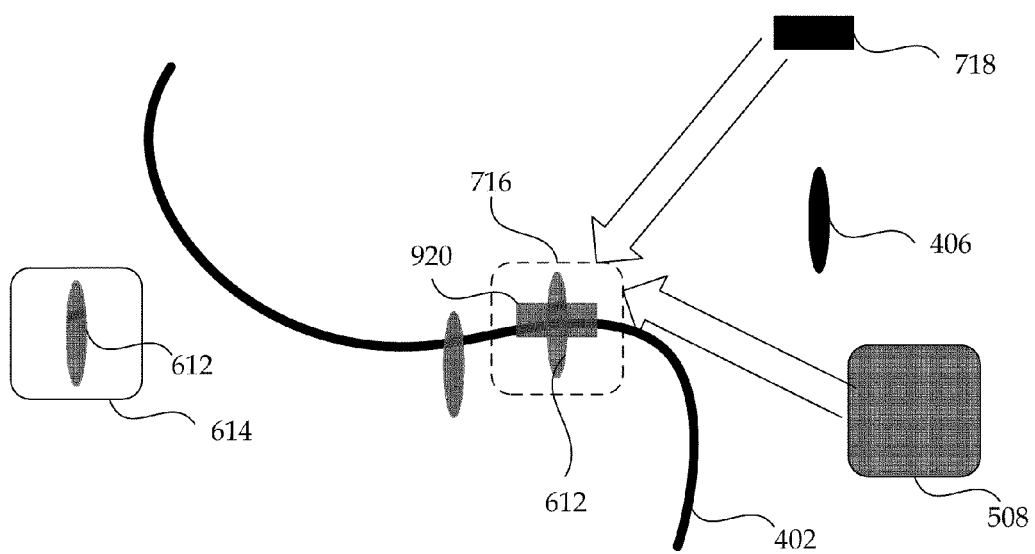
FIG. 9 is a schematic of an example graphics design application and display of painting of the dynamic paint pickup method of FIG. 3.
Figure 10:
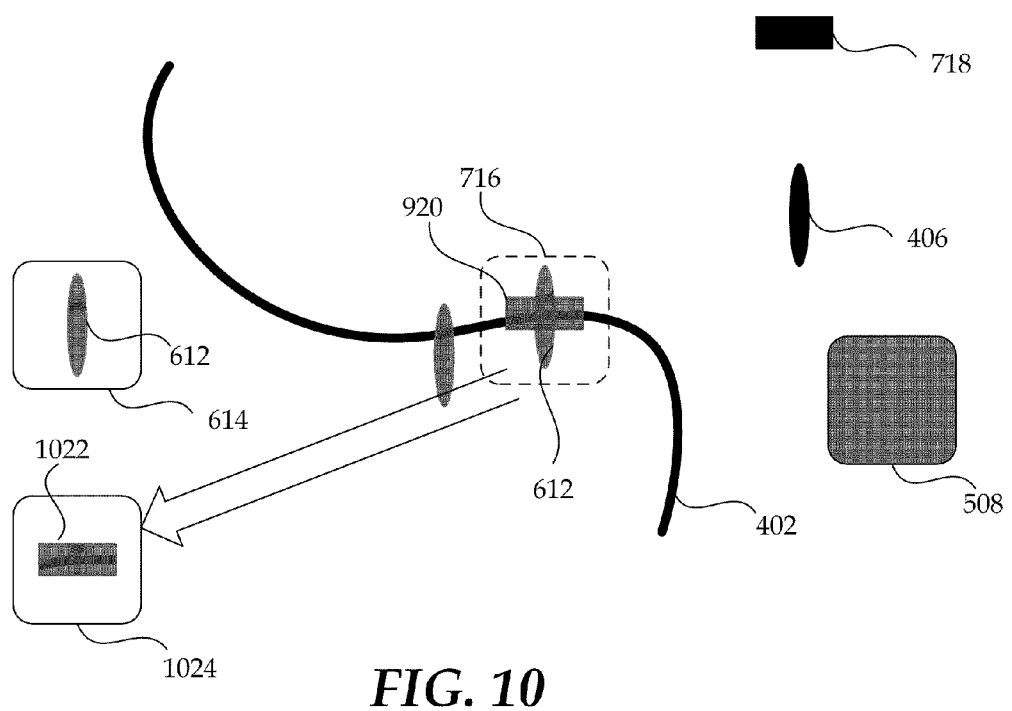
FIG. 10 is a schematic of an example graphics design application and display of a copy back of the dynamic paint pickup method of FIG. 3.

In some cases, as shown in the example of FIGS. 8-10, the stamp locations may be separated from one another (e.g., not overlapping), and/or the determined stamp may change from one stamp to another. Thus, the resulting transfer of the pickup data store having a prior stamp mask may create an undesired display complexity to the manipulation of pixels. Thus, in some cases, the pixels contained in the pickup data store may be merged into the paint data store to contaminate the paint data store. In some cases, the injection color attributes may be re-injected into the contaminated paint data store to enhance or strengthen the appearance of the pre-determined color in the paint data store. The contamination and re-injection is described further with reference to the method 1100 of FIG. 11 using an injection color data store, in addition to a paint data store and pickup data store, to store an un-contaminated version of the pre-defined injection color attributes.

Figure 11:
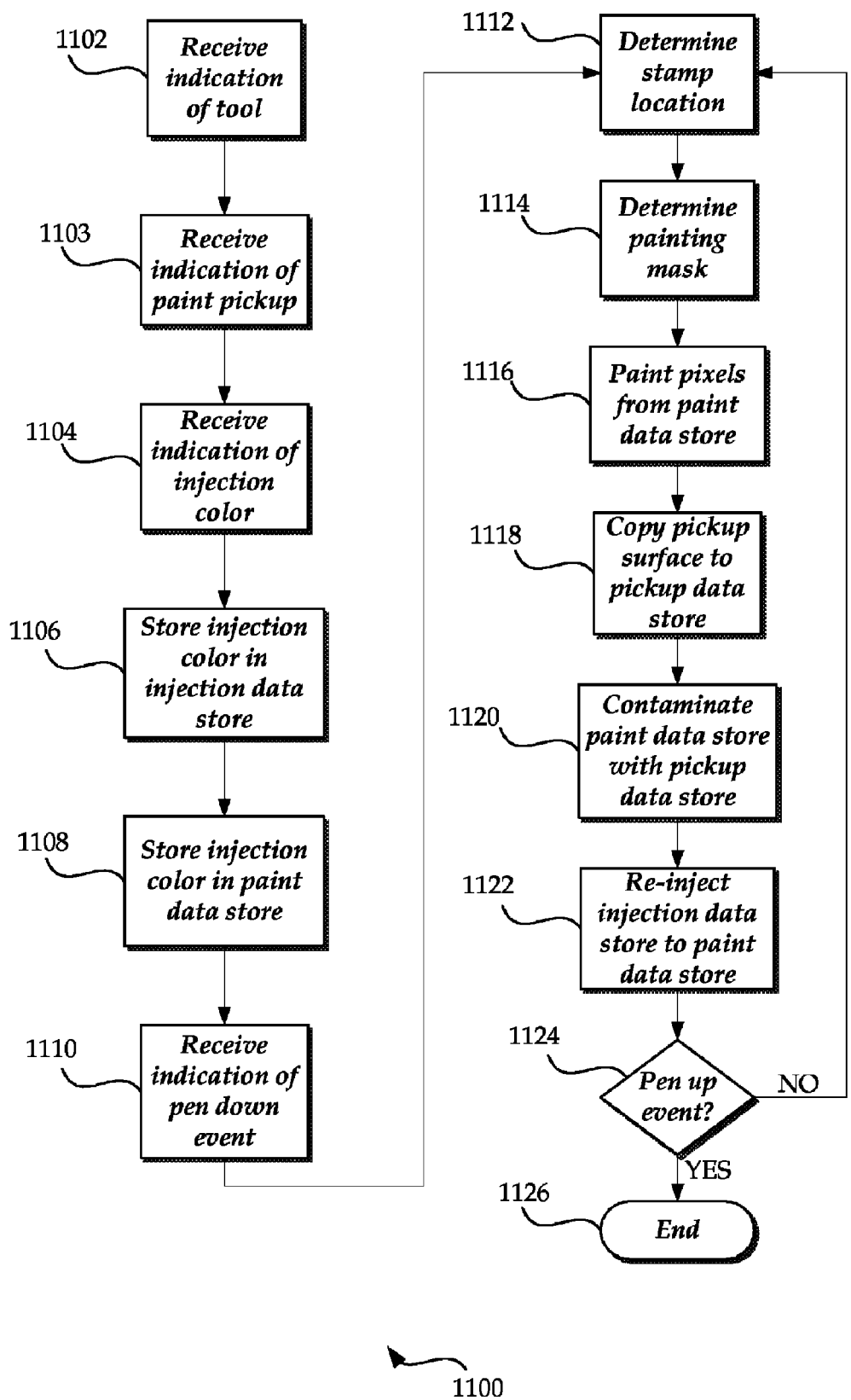
FIG. 11 is a flow chart of an example dynamic paint pick up method.

With reference to the method 1100 of FIG. 11, an indication of a pixel data manipulation tool may be received 1102, an indication of dynamic paint pickup may be received 1103, and an indication of a pre-defined injection color may be received 1104 similar to that described above with reference to the method 300 of FIG. 3. The pre-defined injection color attribute(s) may be stored 1106 in an injection data store, such as an injection data store buffer, which may be a part of data store 122 and/or system memory 104 of FIG. 1. The pre-defined injection color, and thus the color attributes stored in the injection data store, may be static or dynamic (e.g., varying over the length of the stroke) and may be based on a method of determining the injection color (e.g., variable, variable within limits, random, and the like). The paint data store may be initialized by storing 1108 the pre-defined injection color attributes in the paint data store, such as a paint data store buffer.

An indication of a pen down event may be received 1110, the stamp location may be determined 1112, and the painting mask determined 1114 similar to that described above with reference to the method 300 of FIG. 3. With reference to the schematic diagram 1200 of FIG. 12, the display of the workspace of the graphics design application may include existing pixels 1202, and the determined stamp location for a new stroke may be determined as location 1204. The painting mask may be the determined painting mask 1206, shown in the shape of a vertical ellipse, as the stamp to be applied at that stamp location. The painting mask may be determined in any suitable manner, such as through an algorithm, retrieved from a data store (such as data store 122 of FIG. 1), and the like.

Figure 13:
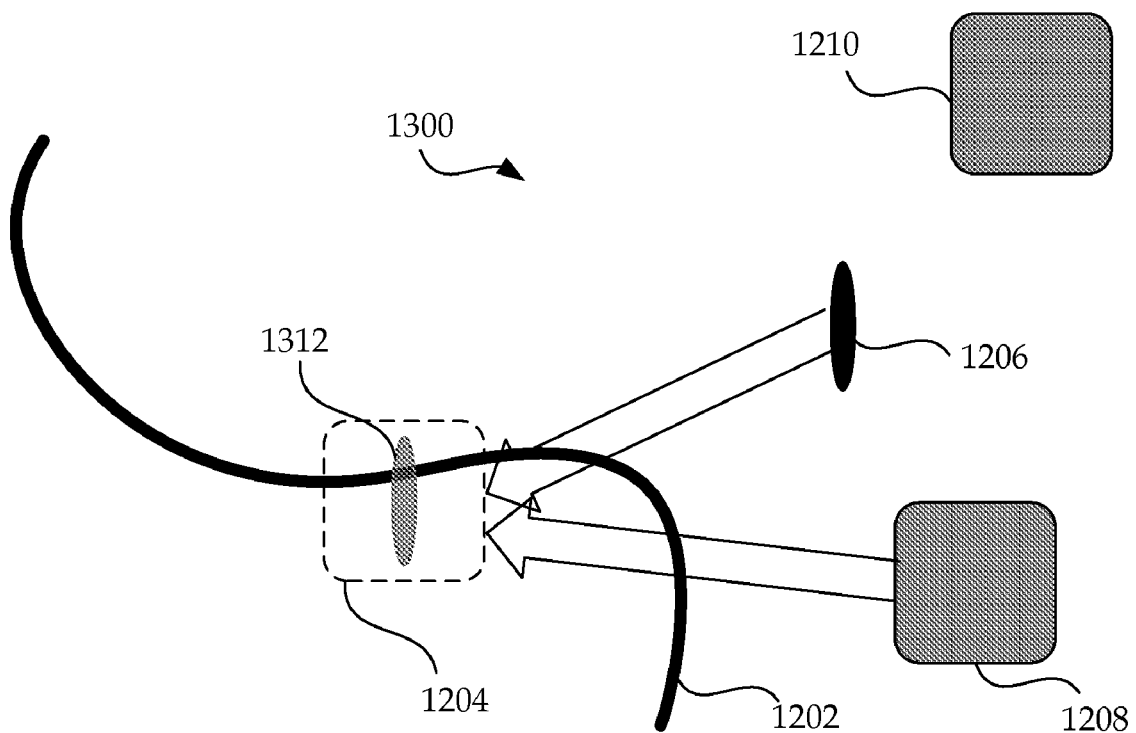
FIG. 13 is a schematic of an example graphics design application and display of painting of the dynamic paint pickup method of FIG. 11.

At the determined stamp location, the color attributes from the paint data store may be applied to pixels or painted 1116 on the target surface using the determined painting mask. At the first stamp in the stroke, the paint data store contains un-contaminated color attributes of the pre-defined injection color. Referring to the example schematic display 1300 of FIG. 13, the painting mask 1206 may be combined with the color attributes of the paint data store 1208 to paint pixels at the stamp location 1204, which is shown as a plurality of semi-transparent pixels 1312 in the shape of a vertical ellipse.

Figure 14:
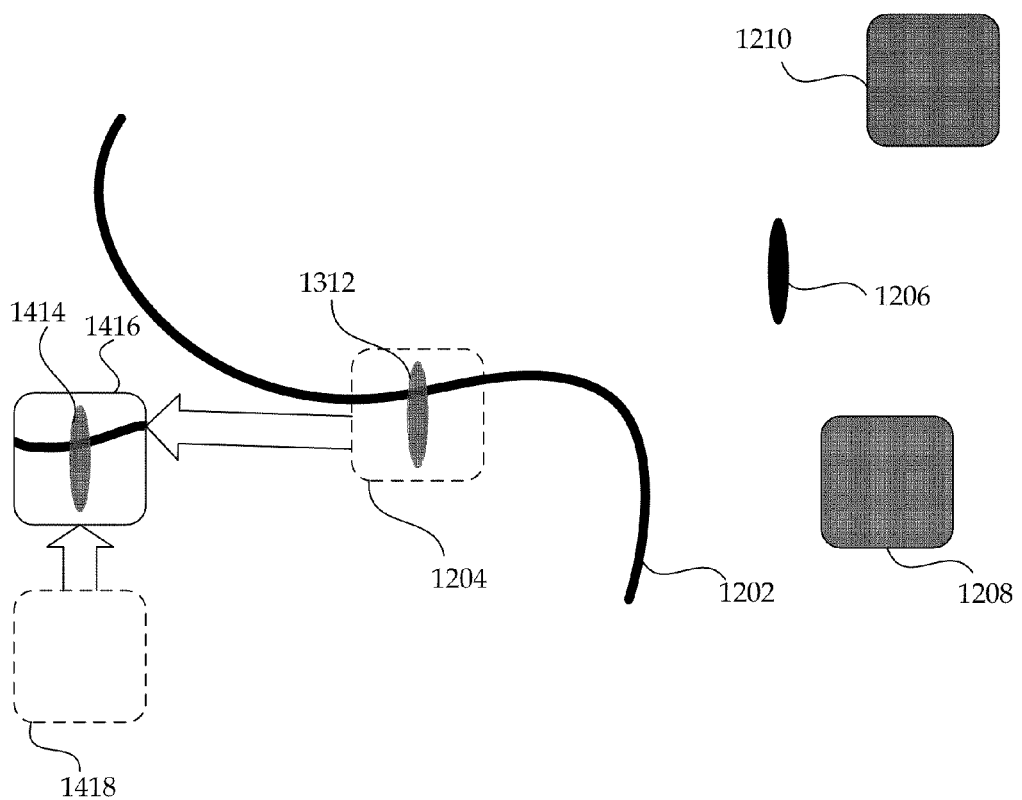
FIG. 14 is a schematic of an example graphics design application and display of a copy back of the dynamic paint pickup method of FIG. 11.

A pickup mask may be used to pickup 1118 one or more pixels proximate the determined stamp position to copy a portion of the pickup surface. The copied pixels may be stored in any suitable manner, such as in the pickup data store. The pickup mask may be determined in any suitable manner, such as by the pickup module 128 of FIG. 1. For example, the pick up mask may be the same mask as the painting mask determined 1114 above or may be an independently determined pickup mask, which may be static or dynamic over the length of a single stroke. The pickup mask may be determined as a default mask shape which may be independent of or based upon one or more masks to be used as a painting mask. In some cases, all masks or at least the size limitations for all masks to be used to 'paint' the stroke may be determined to determine a sufficient size for the pickup mask. As shown in the example schematic display of FIG. 14, the pickup mask is determined as pickup mask 1418 and the pickup surface is defaulted to the target surface. The painted pixels 1312 and a portion of the existing pixels 1202 may be masked by the mask 1418 at the determined stamp location 1204 to copy pixels 1414 to update the pickup data store 1416.

Figure 12:
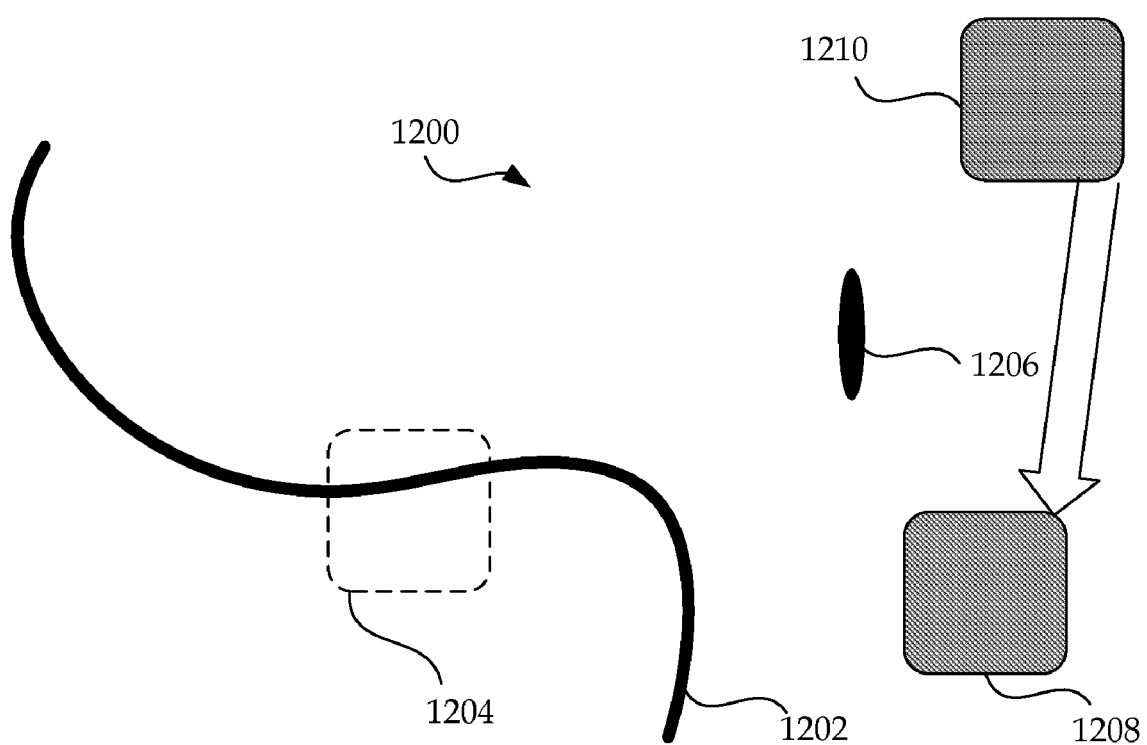
FIG. 12 is a schematic of an example graphics design application and display of a first stamp position of the dynamic paint pickup method of FIG. 11.

The pickup data store may then be used to contaminate 1120 the contents of the paint data store in any suitable manner. For example, the color attribute information of pixels at particular locations in the pickup data store may be combined, mixed, merged and the like with the color attributes of pixels at identical locations in the paint data store, and the resulting combination may be used to update the paint data store. With reference to the electronics design application of FIG. 1, the tool module 126 and/or the pickup module 128, or any other suitable module, may contaminate the paint data store color attribute information with the color attribute information of the pickup data store. With reference to the example schematic 1500 of FIG. 15, the paint data store 1208 of FIG. 12 is contaminated with the contents of the pickup data store 1416 of FIG. 14 to update the paint data store, shown as paint data store 1520.

The color attribute information of two or more data stores may be combined in any suitable manner, such as mixed to form a new color, each color attribute applied to a separate portion of the brush mask (e.g., stamp), and the like.

Any suitable mixing algorithm may be used such as additive, subtractive, multiplicative, and the like. For example, the color attributes of two or more data stores may be mixed or combined in any suitable manner, such as alpha mixing. In another example, the contaminated color attribute C of a pixel may be a weighted sum of the color values (C1) of one or more pixels of the pickup data store and the color (C2) of the of one or more pixels at the same geographic location in the paint data store, where the weights of the combination may be default or indicated mixture values. The contaminated color attribute (C) may be represented as:

$$C=p*C1+(1-p)C2 \quad (1)$$

where p is a mixture parameter as a percentage of mixture such as 25%. The indicated percentage of mixture may be a default value or may be user indicated. The user indicated mixture parameter may be indicated in any suitable manner with a mixture selector displayed as any suitable user interface device, such as a selectable menu, button, slider, text box, etc. For example, as shown in FIG. 2, the mixture selector is a slider 236, where sliding the indicator to the left (e.g., at position 238) indicates 0% mixture (e.g., the opacities of the pixels in the pickup data store are scaled down to 0% and effectively none of the determined paint pickup is mixed) and sliding to the right (e.g., at position 240) indicates a 100% mixture (e.g., the opacities of the pixels in the pickup data store is used unchanged) to mix with the user defined color attributes. Although a percentage mixture with a slider is illustrated in FIG. 2, it is to be appreciated that any suitable indicator of amount of mixture as a mixture parameter may be used, such as fractions, user defined weighting values, and the like, and may be indicated by the user by any suitable user interface device. In some cases, the user may provide an indication of the mixture amount by manipulating or selecting a user interface device such as a slider or text box. In some cases, the mixture may be dynamically determined based on user inputs such as pressure applied by a user input device (e.g., stylus), speed of the user interface applicator across the target surface, and the like.

In some cases, either or both of the color attributes of the combined data stores may have an opacity that is less than 100% (i.e., partially transparent). Thus, the opacity of the determined color attributes of the pixels of the pickup data store and/or the color attributes of the pixels of the paint data store may be incorporated into the mixture algorithm of mixing the color attributes. In some cases, the color attribute C and the opacity O of the contaminated pixel of the paint data store may be determined by alpha mixing an opacity scaled pixel of the pickup data store, with color value (C1) and opacity (O1), onto the pixel of the paint data store with color value (C2) of and opacity (O2). The resulting contaminated pixel of the paint data store may be represented as:

$$O=O2+(1-O2)*O1*p \quad (2)$$

$$C=C2*(1-O1*p)+C1*p \quad (2.1)$$

While the above examples of the mixture of color attributes describes two properties (i.e., opacity and color) and alpha mixing, the determination of the displayed attributes of the pixel data manipulation tools may be extended to any other additional and/or alternative properties with any suitable formulae.

Figure 15:
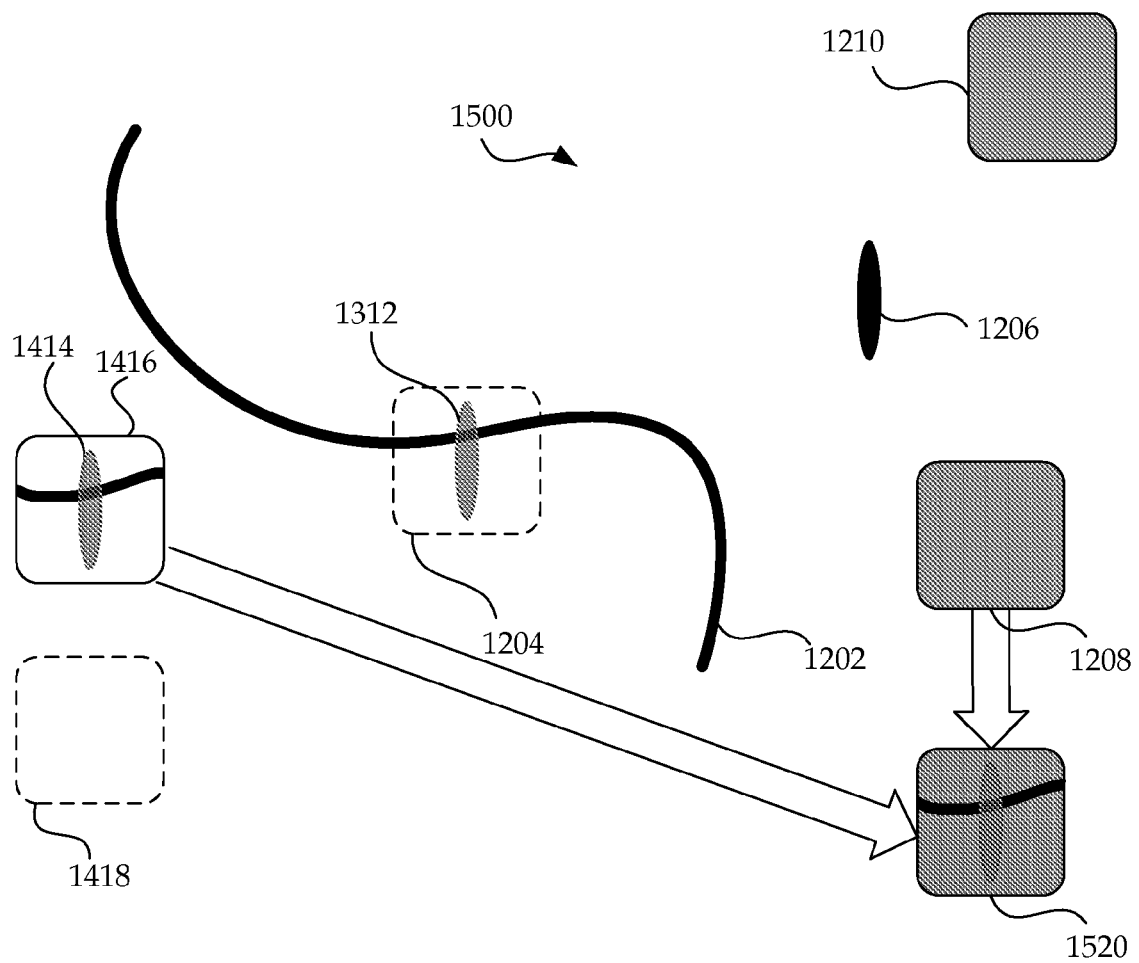
FIG. 15 is a schematic of an example graphics design application and display of a contamination of the dynamic paint pickup method of FIG. 11.

The injection color data store may then be re-injected 1122 into the contents of the paint data store in any suitable manner. For example, the color attribute information of pixels at particular locations in the injection color data store may be combined, mixed, merged and the like with the color attributes of pixels at identical locations in the paint data store, and the resulting combination may be used to update the paint data store. With reference to the example schematic 1600 of FIG. 16, the paint data store 1520 of FIG. 15 is re-injected with the contents of the injection color data store 1210 of FIG. 12 to update the paint data store, shown as paint data store 1622. It is to be appreciated that the order of contamination and re-injection of the paint data store may be accomplished in any order in some cases and even together with certain suitable choice of mixing formulae.

Figure 17:
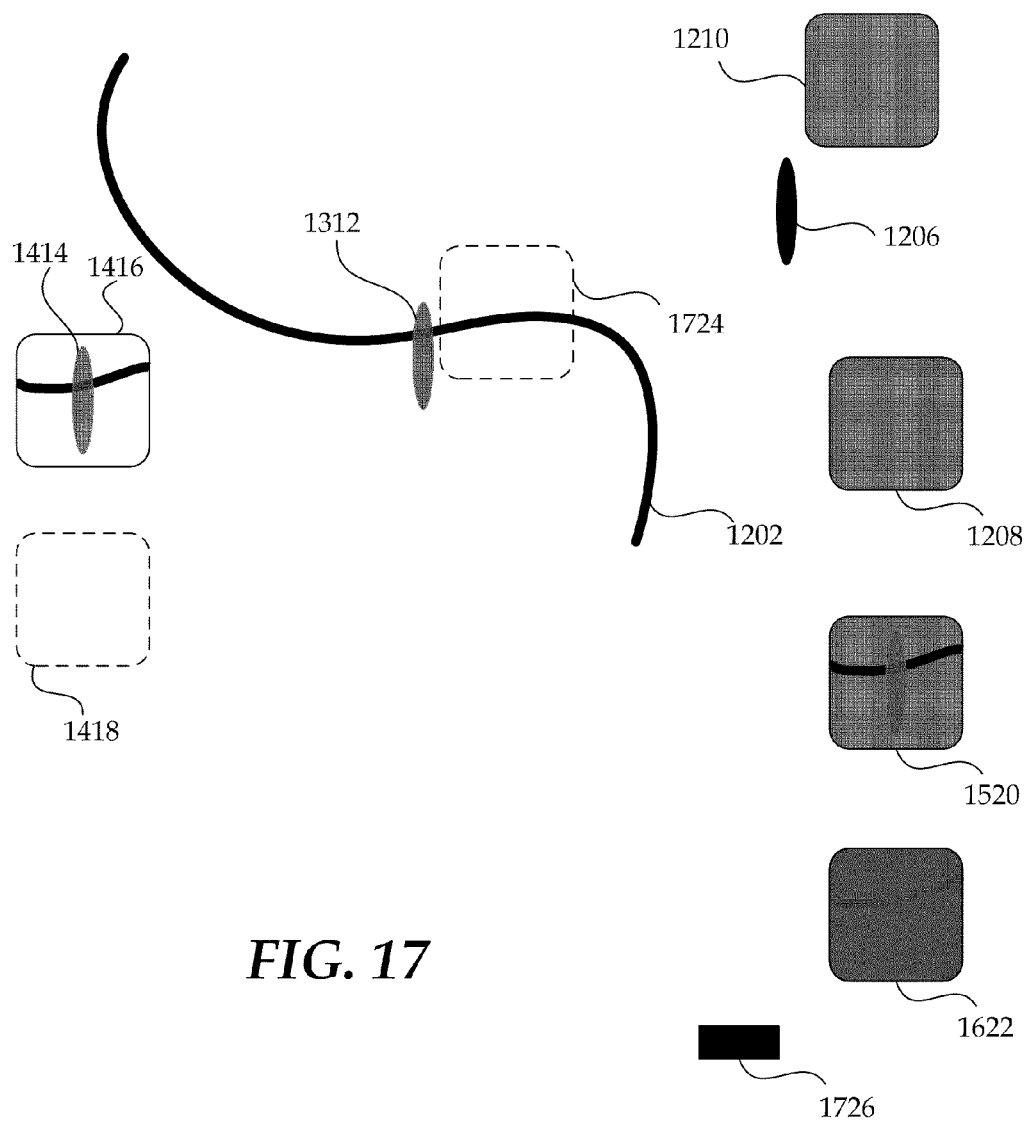
FIG. 17 is a schematic of an example graphics design application and display of a second stamp position of the dynamic paint pickup method of FIG. 11.

If the graphics design application has not received 1124 an indication of a pen up event, the method may return to determining 1112 the next stamp location, such as when the user moves the user interface device applicator across the digital surface. The painting mask may be determined 1114, which may be same as or different than the painting mask determined in the previous stamp. With reference to the example schematic of FIG. 17, the second stamp location 1724 may be determined and the second stamp mask 1726 determined as forming a rectangle.

Figure 18:
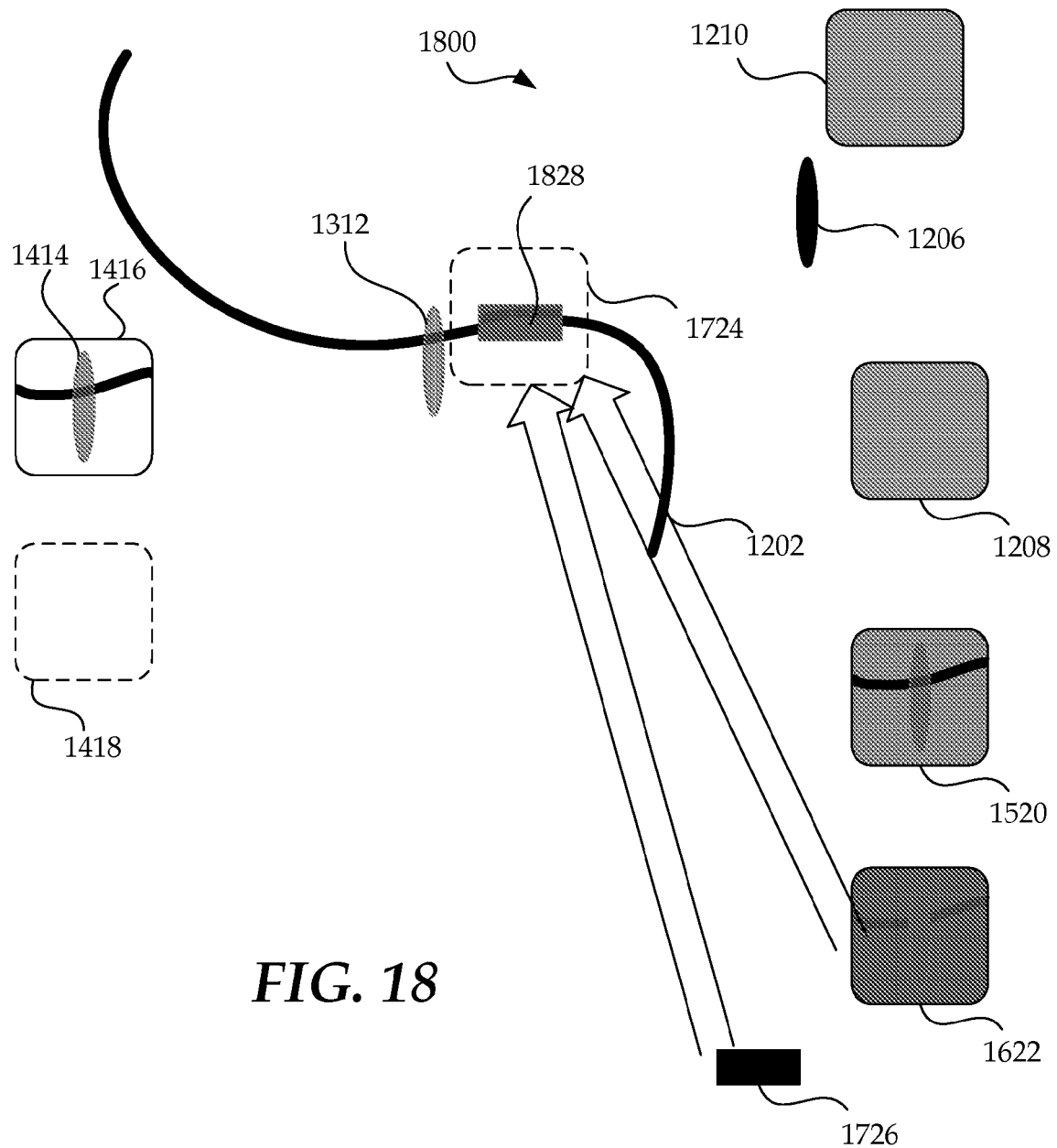
FIG. 18 is a schematic of an example graphics design application and display of painting of the dynamic paint pickup method of FIG. 11.

At the determined stamp location, the color attributes from the paint data store may be applied to pixels or painted 1116 on the target surface using the determined painting mask. As noted above, at the second and/or subsequent stamps in the stroke, the paint data store contains contaminated and re-injected color attributes. Referring to the example schematic display 1800 of FIG. 18, the painting mask 1726 of FIG. 17 may be combined with the color attributes of the paint data store 1622 of FIG. 16 to paint pixels at the stamp location 1724, which is shown as a plurality of semi-transparent pixels 1828 in the shape of a rectangle.

Figure 19:
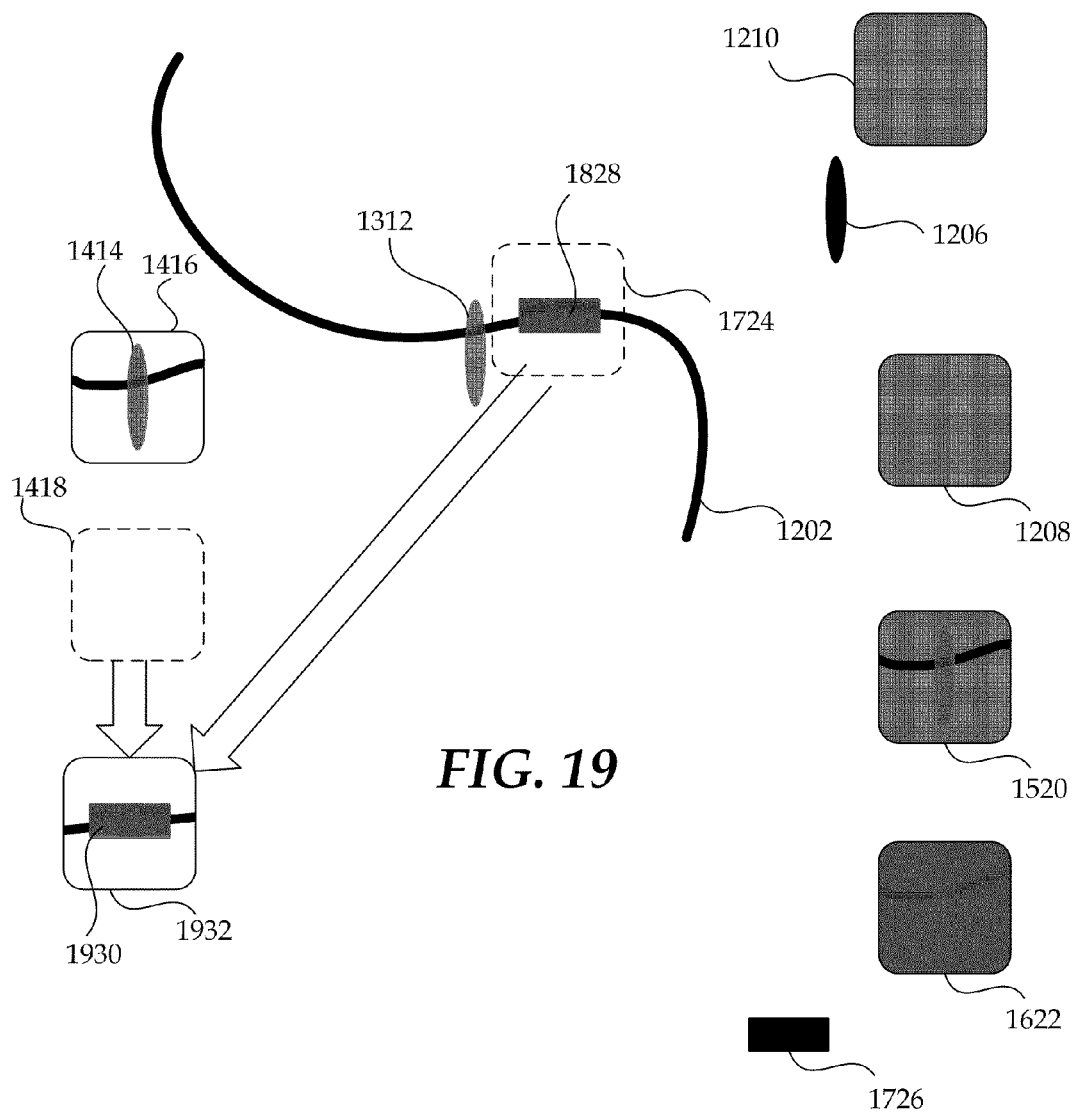
FIG. 19 is a schematic of an example graphics design application and display of a copy back of the dynamic paint pickup method of FIG. 3.

A pickup mask may be used to pickup or copy 1118 one or more pixels proximate the determined stamp position to copy a portion of the pickup surface. The copied pixels may be stored in any suitable manner, such as in the pickup data store. As shown in the example schematic display of FIG. 19, the pickup surface is the target surface and, the painted pixels 1828 and a portion of the existing pixels 1202 may be masked by the pickup mask 1418 at the determined stamp location 1724 to copy pixels 1930 to update the pickup data store 1932. Although this example displays the pickup mask shape as static over the length of the stroke, it is to be appreciated that the pickup mask may change from one stamp to the next or from time to time.

Figure 16:
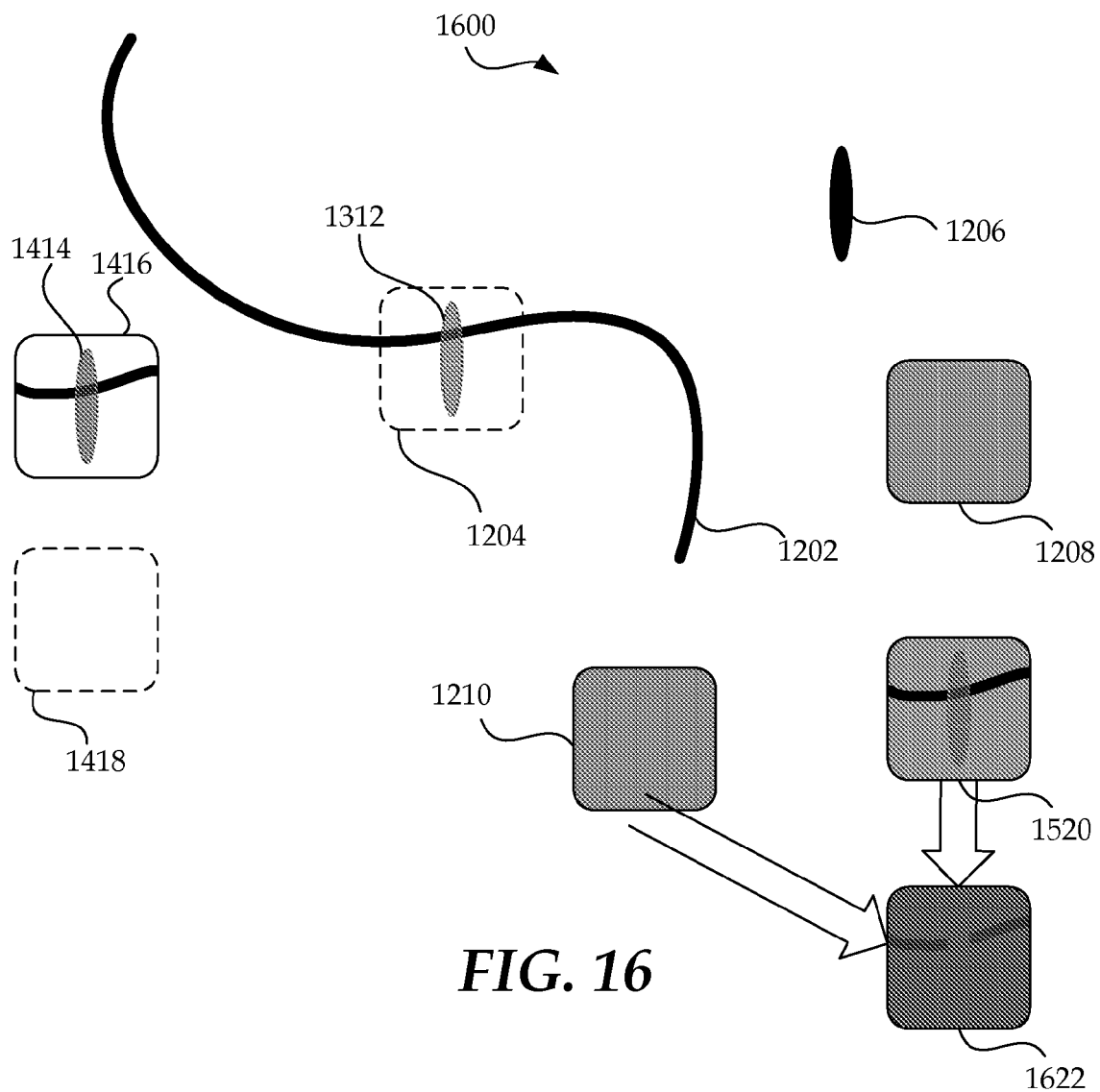
FIG. 16 is a schematic of an example graphics design application and display of a re-injection of the paint buffer of the paint pickup method of FIG. 11.

The pickup data store may then be used to contaminate 1120 the contents of the paint data store in any suitable manner. With reference to the example schematic 2000 of FIG. 20, the paint buffer 1622 of FIG. 16 is contaminated with the contents of the pickup buffer 1932 of FIG. 19 to update the paint buffer, shown as paint buffer 2034.

Figure 20:
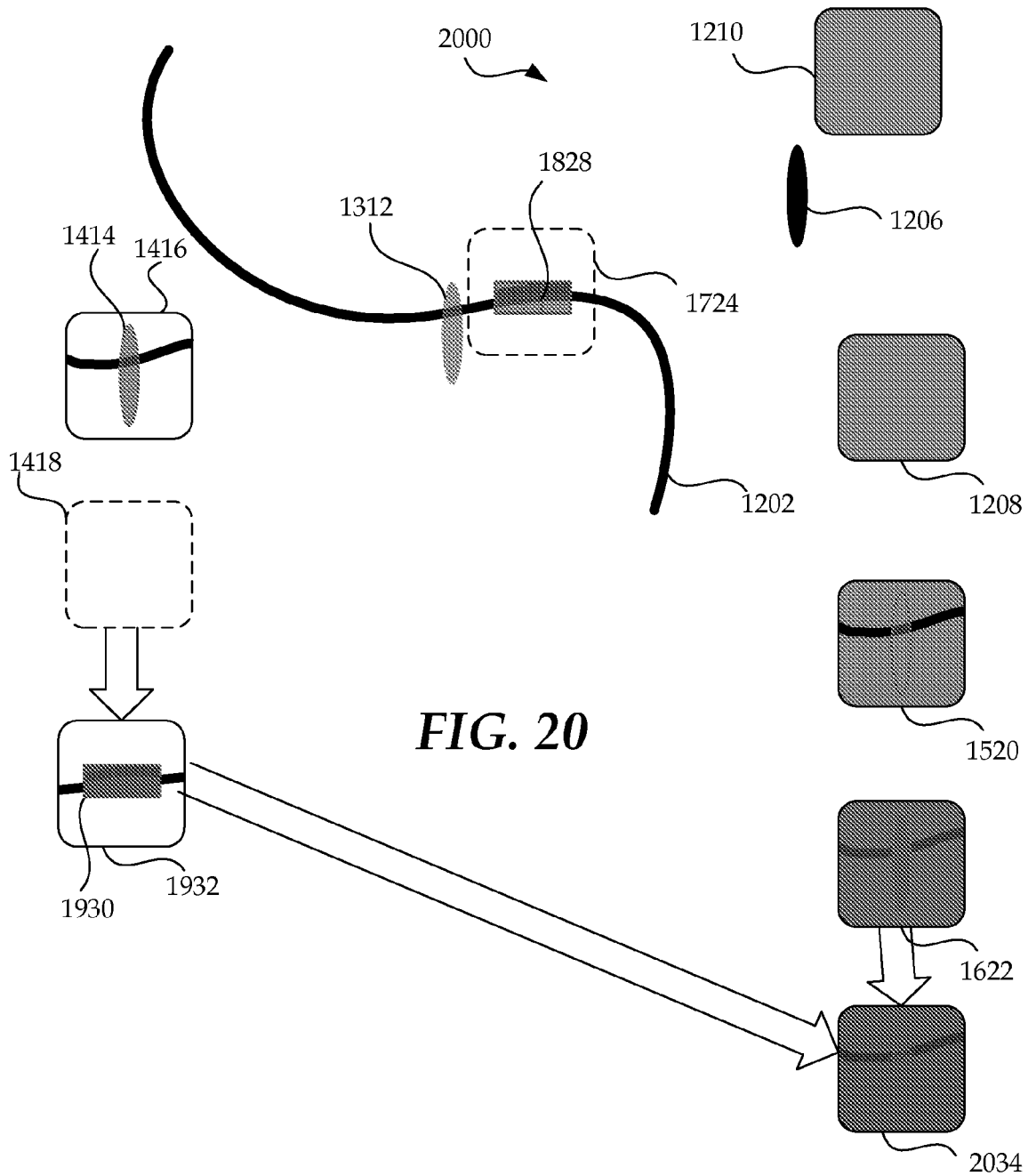
FIG. 20 is a schematic of an example graphics design application and display of a contamination of the dynamic paint pickup method of FIG. 11.
Figure 21:
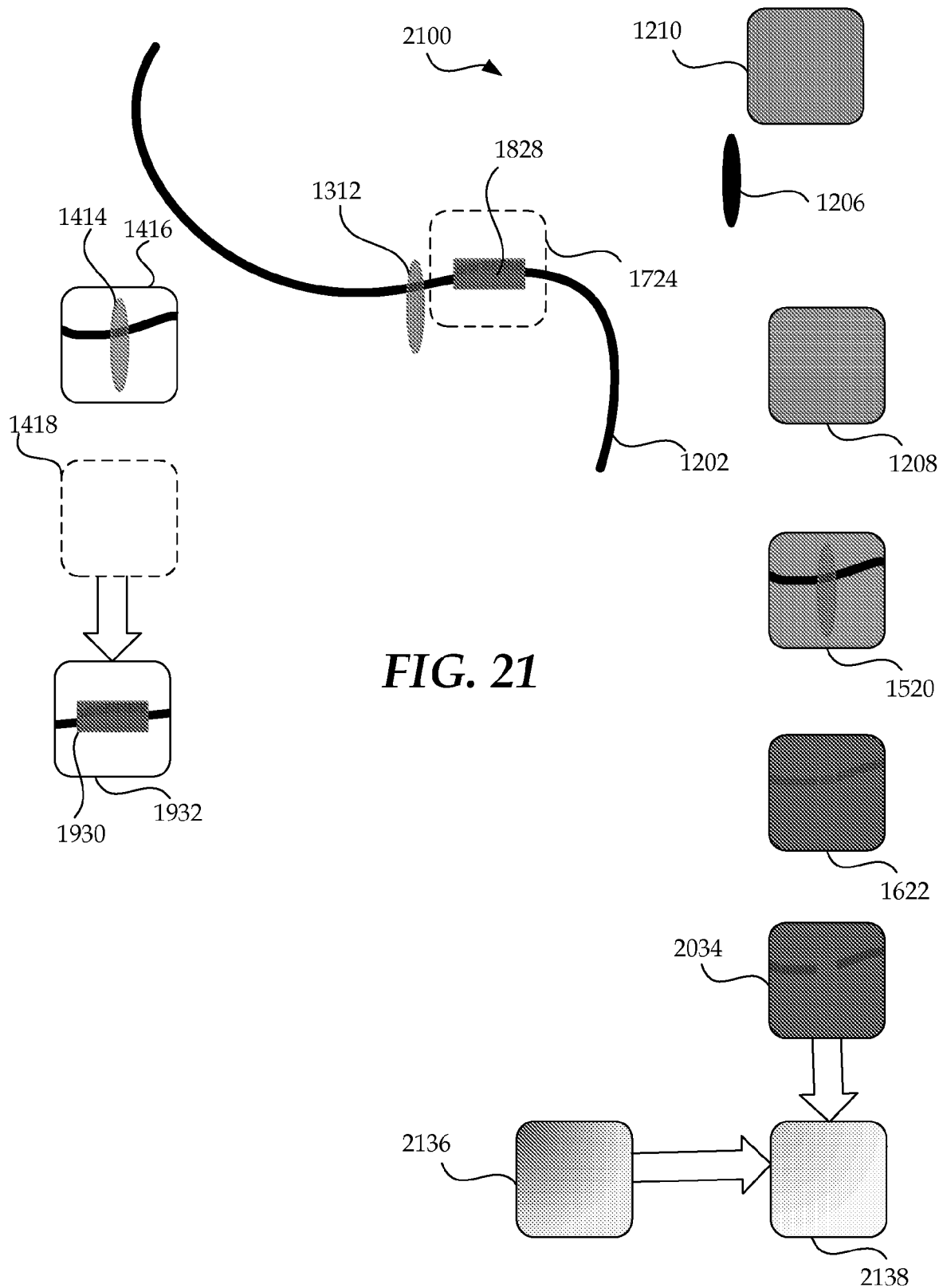
FIG. 21 is a schematic of an example graphics design application and display of a re-injection of the paint buffer of the paint pickup method of FIG. 11.

The injection color data store may then be used to re-inject 1122 the contents of the paint data store in any suitable manner. For example, the color attribute information of pixels at particular locations in the injection color data store may be combined, mixed, merged and the like with the color attributes of pixels at identical locations in the paint data store, and the resulting combination may be used to update the paint data store. It is to be appreciated that the injection color attribute information, although not contaminated with color attribute information from the pickup data store, may be dynamic from one stamp to the next, such as in a variable color paint such as a gradient paint, a random paint, or any other paint defined by an algorithm. With reference to the example schematic 2100 of FIG. 21, the paint data store 2034 of FIG. 20 is re-injected with the contents of the injection color data store 2136, which is a new pre-defined injection color as determined by the tool module of the graphics design application, to update the paint data store, shown as paint data store 2138.

Figure 29:
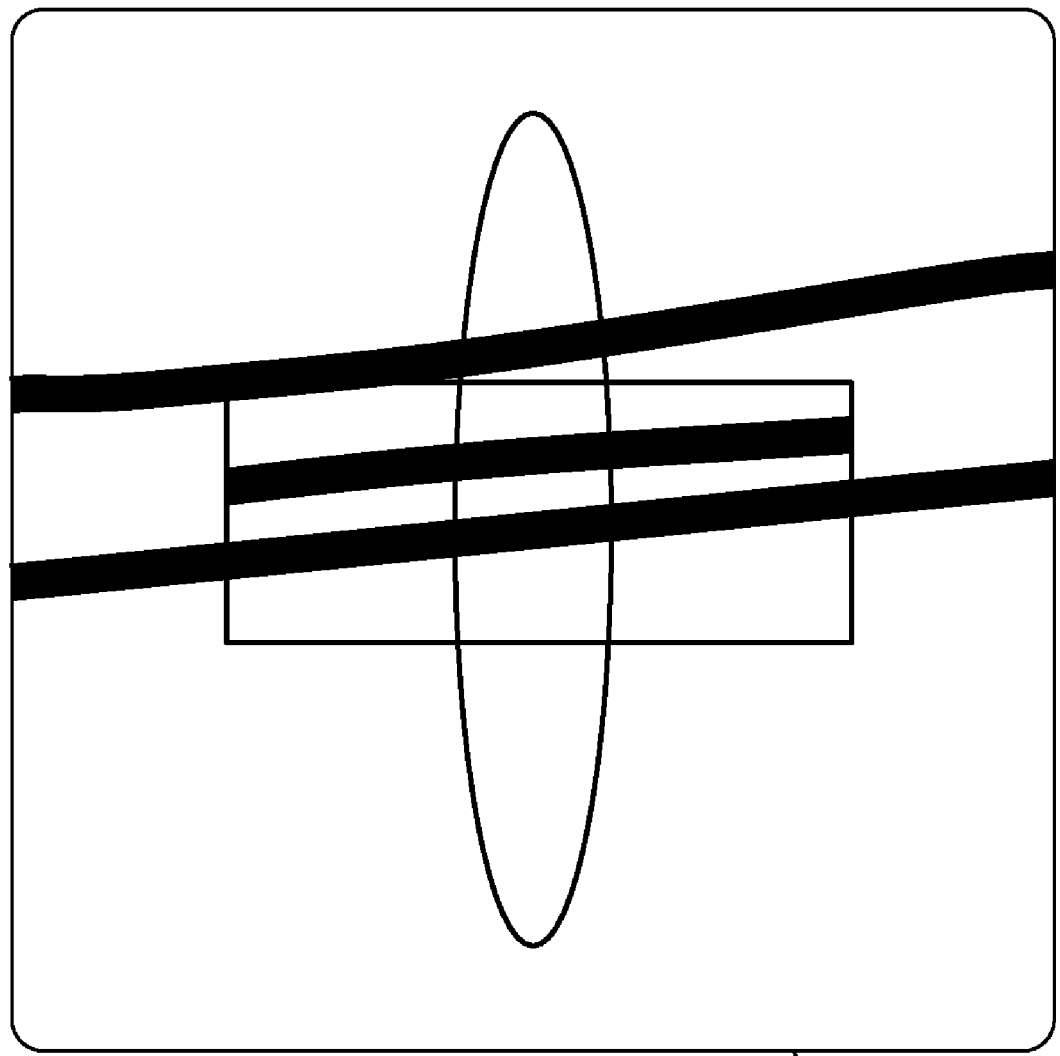
FIG. 29 is a schematic of a paint data store of FIG. 21.

With the repeated contamination and re-injection, the contents of the paint data store 2138 may become more and more indistinct. FIG. 29 illustrates a schematic line drawing of the contents of the paint data store 2138 of FIG. 21.

It is to be appreciated that the order of contamination and re-injection of the paint data store may be accomplished in any order and even together. With reference to the method of FIG. 11, if the graphics design application has received 1124 an indication of a pen up event, the method may end 1126.

As noted above, in some cases, the contamination and re-injection of the paint data store may accomplished simultaneously. For example, this may be done with some brush types such as image brush types, where the transparency mask is pre-merged with the injection color attribute information, and are not stored separately. The method of FIG. 22 illustrates an example method of combining the contamination and re-injection steps of dynamic paint pickup with an example injection image as a merged painting mask and injection color.

Figure 22:
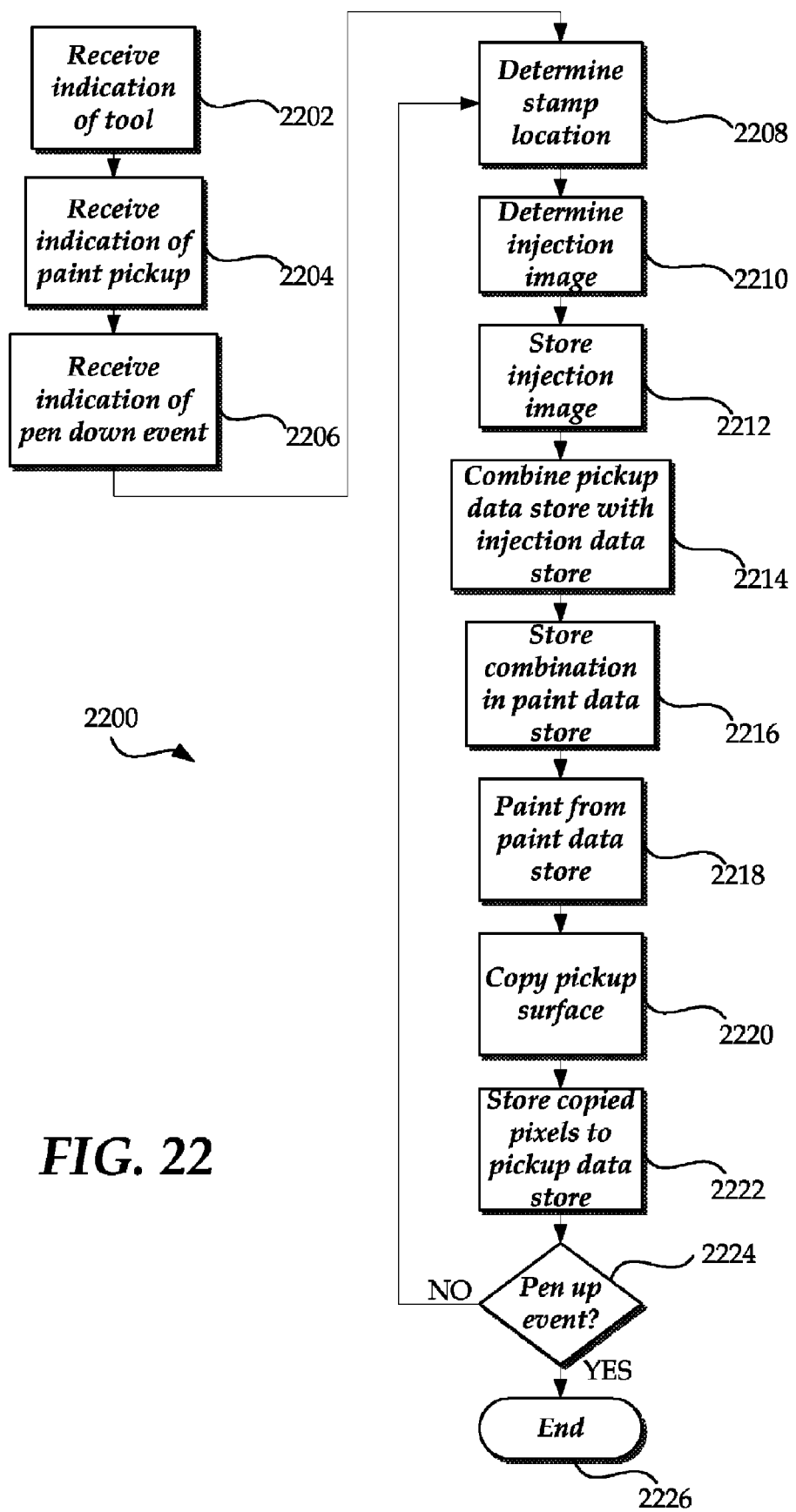
FIG. 22 is a flow chart of an example dynamic paint pickup method.
Figure 23:
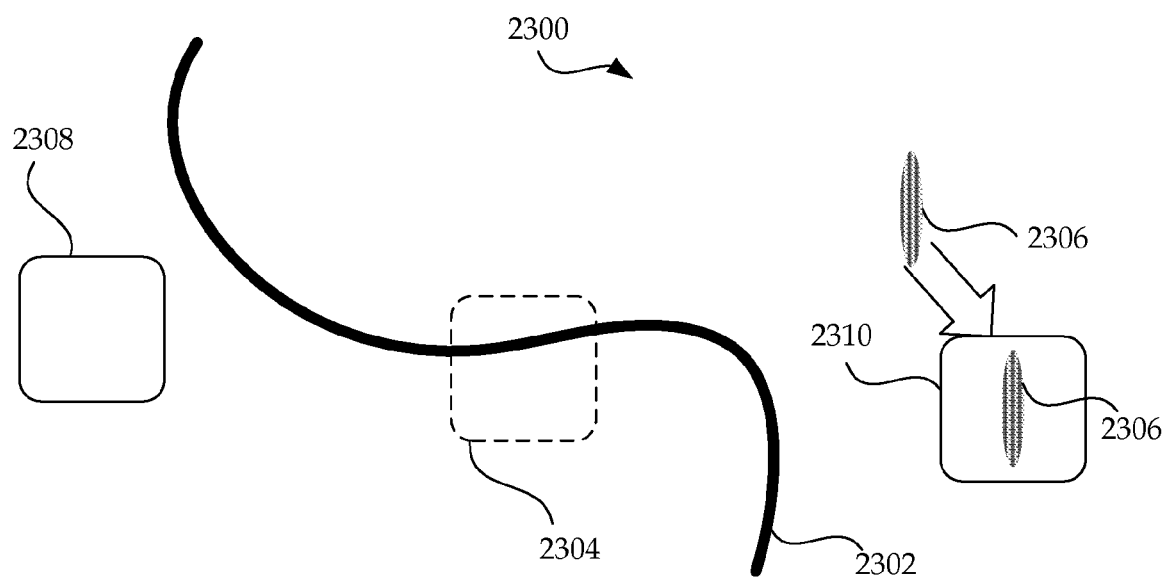
FIG. 23 is a schematic of an example graphics design application and display of a contamination and re-injection of the dynamic paint pickup method of FIG. 22.

With reference to the method 2200 of FIG. 22, an indication of a pixel data manipulation tool may be received 2202, and an indication of dynamic paint pickup may be received 2204, similar to that described above with reference to the method 300 of FIG. 3. An indication of a pen down event may be received 2206, and the stamp location may be determined 2208 similar to that described above with reference to the method 300 of FIG. 3. With reference to the example schematic display 2300 of FIG. 23, the display of the workspace of the graphics design application may include existing pixels 2302, and the determined location for a new stamp as location 2304.

The injection image may be determined 2210 in any suitable manner. In some cases the injection image may be retrieved from memory and/or cropped, rotated or otherwise manipulated as indicated by the user, which is the automatic merging of the input image with the painting mask. The injection image may also be dynamic from one stamp to the next over the length of the stroke. For example, the user may indicate that the injection image includes only a portion of an indicated image, and each stamp may choose (according to some pre-defined algorithm) a portion of the image to be used as the current injection image. The injection image may be stored 2212 in an injection data store.

The pixels of the pickup data store and the injection data store may then be combined 2214 in any suitable manner and the combined pixels and color attributes may be stored in a paint data store 2216. For example, the color attribute information of pixels at particular locations in the pickup data store may be combined, mixed, merged and the like with the color attributes of pixels at identical locations in the injection data store, and the resulting combination may be used to update the paint data store. In the initial stamp of the stroke, the pickup data store may be empty (i.e., no pixels have been copied into the pickup data store) and the step may be optional on the first stamp or accomplished with no change to the stamp image. With reference to the schematic display of FIG. 23, the stamp image 2306 of the injection data store may be combined with the empty pickup buffer 2308 and the combined results (the same stamp image 2306) may be stored in the paint data store 2310. This combination of the injection data store and the pickup data store may accomplish both the contamination of the paint data store and the re-injection of the data store at substantially the same time.

Figure 24:
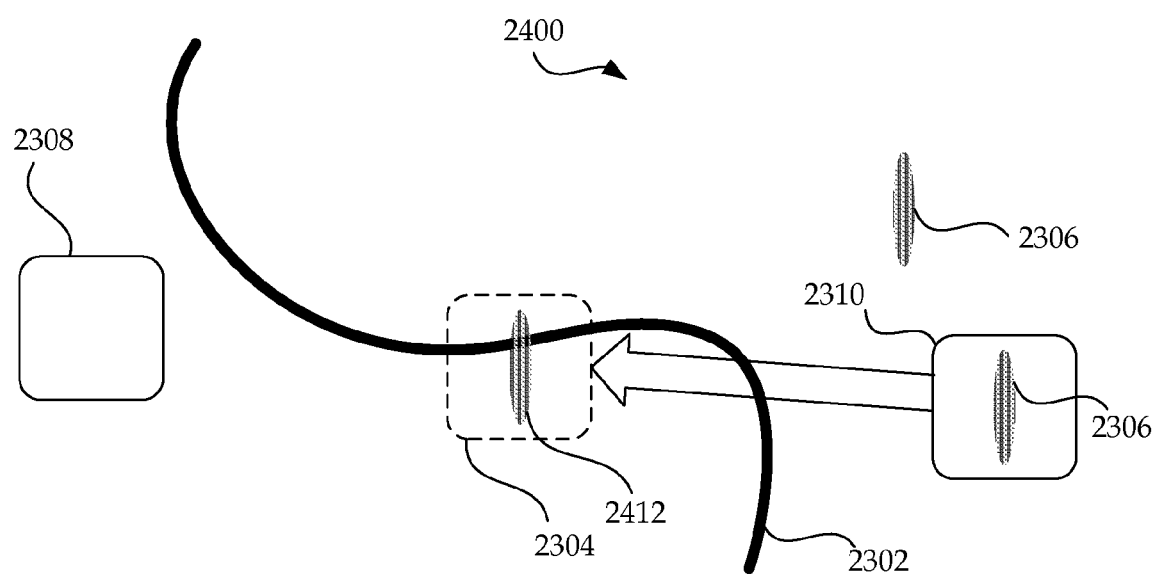
FIG. 24 is a schematic of an example graphics design application and display of a painting of the paint pickup method of FIG. 22.

At the determined stamp location, the color attributes from the paint data store may be applied or painted 2218 on the target surface, without the use of a stamp mask. Referring to the example schematic display 2400 of FIG. 24, the color attributes of the paint data store 2310 may be used to paint pixels at the stamp location 2304, and are shown as a plurality of semi-transparent pixels 2412 in the shape of a vertical ellipse.

Figure 25:
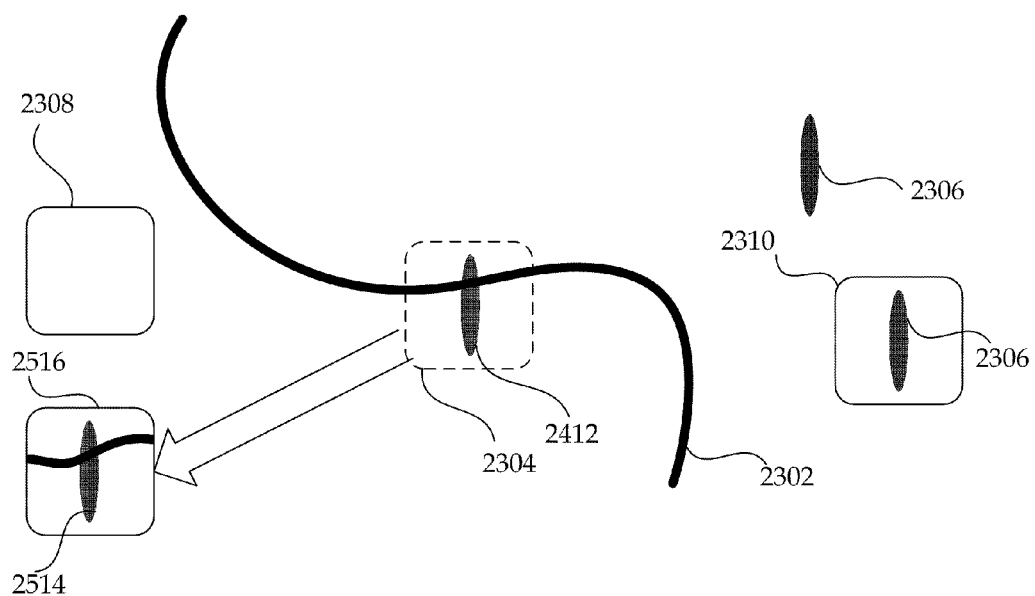
FIG. 25 is a schematic of an example graphics design application and display of a copy back of the dynamic paint pickup method of FIG. 22.

A pickup mask may be used to pickup 2220 one or more pixels proximate the determined stamp position to copy a portion of the pickup surface. The copied pixels may be stored 2222 in any suitable manner, such as in the pickup data store. The pickup mask may be determined in any suitable manner, such as by the pickup module. For example, the pickup mask may be the same shape as the stamp image or may be an independently determined pickup mask which may be static or dynamic over the length of a single stroke. As shown in the example schematic display of FIG. 25, the painted pixels 2412 and a portion of the existing pixels 2302 may be masked by the pickup mask at the determined stamp location 2304 to copy pixels 2514 to update the pickup data store 2516. The pickup mask may be determined as a default mask shape which may be independent of or based upon one or more masks to be used as a painting mask. In some cases, to determine a sufficient size for the pickup mask, all masks or at least the size limitations for all masks to be used to 'paint' the stroke may be determined.

Figure 26:
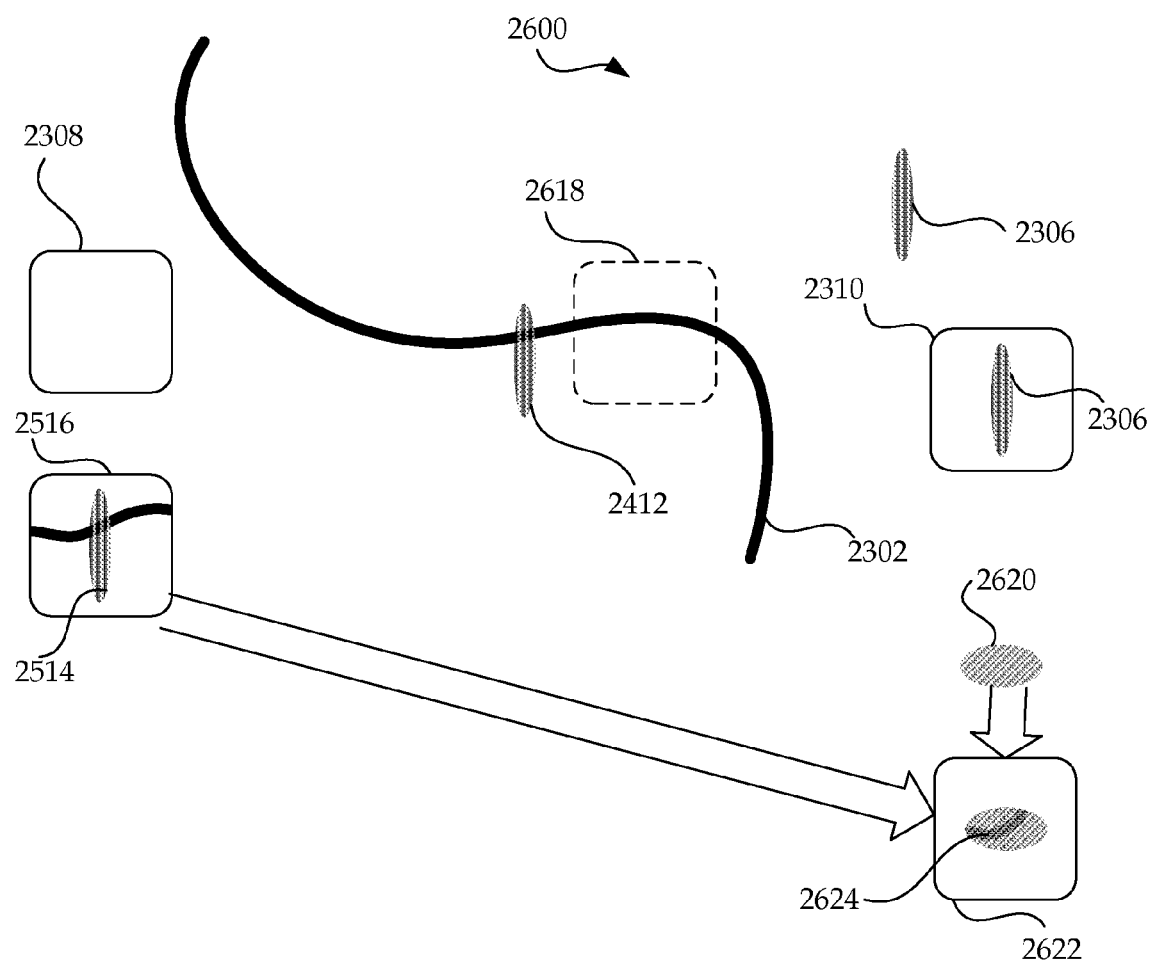
FIG. 26 is a schematic of an example graphics design application and display of a contamination and re-injection at a second stamp position of the paint pickup method of FIG. 22.

If the graphics design application has not received 2224 an indication of a pen up event, the method may return to determining 2208 the next stamp location, such as when the user moves the user interface device applicator across the digital surface. The stamp image may be determined 2210 and stored 2212 in the injection data store. The stamp image of the determined stamp location may be same as or different than the stamp image determined in the previous stamp. With reference to the example schematic of FIG. 26, the second stamp location 2618 may be determined and the second stamp image 2620 determined as forming a horizontal oval.

The pixels of the pickup data store and the injection data store may then be combined 2214 in any suitable manner and the combined pixels and color attributes may be stored 2216 in a paint data store. For example, the color attribute information of pixels at particular locations in the pickup data store may be combined, mixed, merged and the like with the color attributes of pixels at identical locations in the injection data store, and the resulting combination may be used to update the paint data store. Since the pixels of the pickup data store and the injection data store may be full color alpha images, the combination of the pickup data store and the injection data store may combine the color attributes of pixels only at location where pixels are defined in the injection data store (e.g., transparency of the output pixels is identical to that of the corresponding ones in the injection data store), to result in pixels of the paint data store having the same shape as the pixels of the injection data store.

The combination may be accomplished in any suitable manner. For example, the transparency of the pixels in the injection data store may be used to drive the combination. In one example, an alpha pixel of the pickup data store may be defined at least by two parameters [TD, CD] where the parameter TD is the transparency of the pixel and the parameter CD is the pre-multiplied color components of the pixel. An alpha pixel of the injection data store may be defined by at least two parameters [Tb, Cb] where the parameter Tb is the transparency of the pixel and the parameter Cb is the pre-multiplied color components of the pixel. The opacity of the pixel of the pickup data store may be scaled down using the user specified pickup strength (i.e., mixture parameter), such as a weight, percentage of mixture, and the like. In this example, the user may specify a mixture percentage S which may be in the range of 0-100%. Although any suitable algorithm may be used to scale down the opacity, one example of scaling down opacity may be given as:

$$Td = 1 - (1-TD)*S \quad (3)$$

$$Cd = CD*S \quad (4)$$

where the parameter Td is the scaled down transparency of the pixel of the pickup data store and the parameter Cd is the scaled down value of the color attributes of the pixel of the pickup data store.

The parameters of the injection data store [Tb, Cb] may be un-pre-multiplied to parameters [Tu,Cu] respectively in any suitable manner into an opaque color pixel. For example, un-pre-multiply may be accomplished using:

$$Cu = Cb/(1-Tb) \quad (5)$$

$$Tu = 0 \quad (6)$$

The pixel data of the scaled down pixel of the pickup data store may be mixed with the un-pre-multiplied parameters of the pixel of the injection data store using any suitable technique. For example, the pixel data of the pickup data store [Td, Cd] may be alpha mixed with the un-pre-multiplied opaque pixel data of the injection data store [Tu, Cu] or [0, Cb/(1-Tb)] from Equations (5) and (6) above, to result in parameter values of [0, Cd+Td*Cb/1-Tb)]. The opacity may be multiplied back from the opaque pixel to the color mixed pixel with the same opacity as the original pixel of the injection image pixel to result in the mixed pixel to be stored in the paint data store which may have parameter values defined by:

$$[Tb, (1-Tb)*((Td*Cb)/(1-Tb)+Cd)] = [Tb, Td*Cb + (1-Tb)*Cd)] \quad (7)$$

This process may be repeated for each pixel in the injection data store and corresponding pixel in the pickup data store to achieve the mixed contents of the paint data store. With reference to the example schematic diagram 2600 of FIG. 26, the injection image 2620 may be combined with the pixels 2514 of the pickup buffer 2516 to generate pixels 2622 in the shape of the stamp image and stored in the paint data store 2624.

Figure 27:
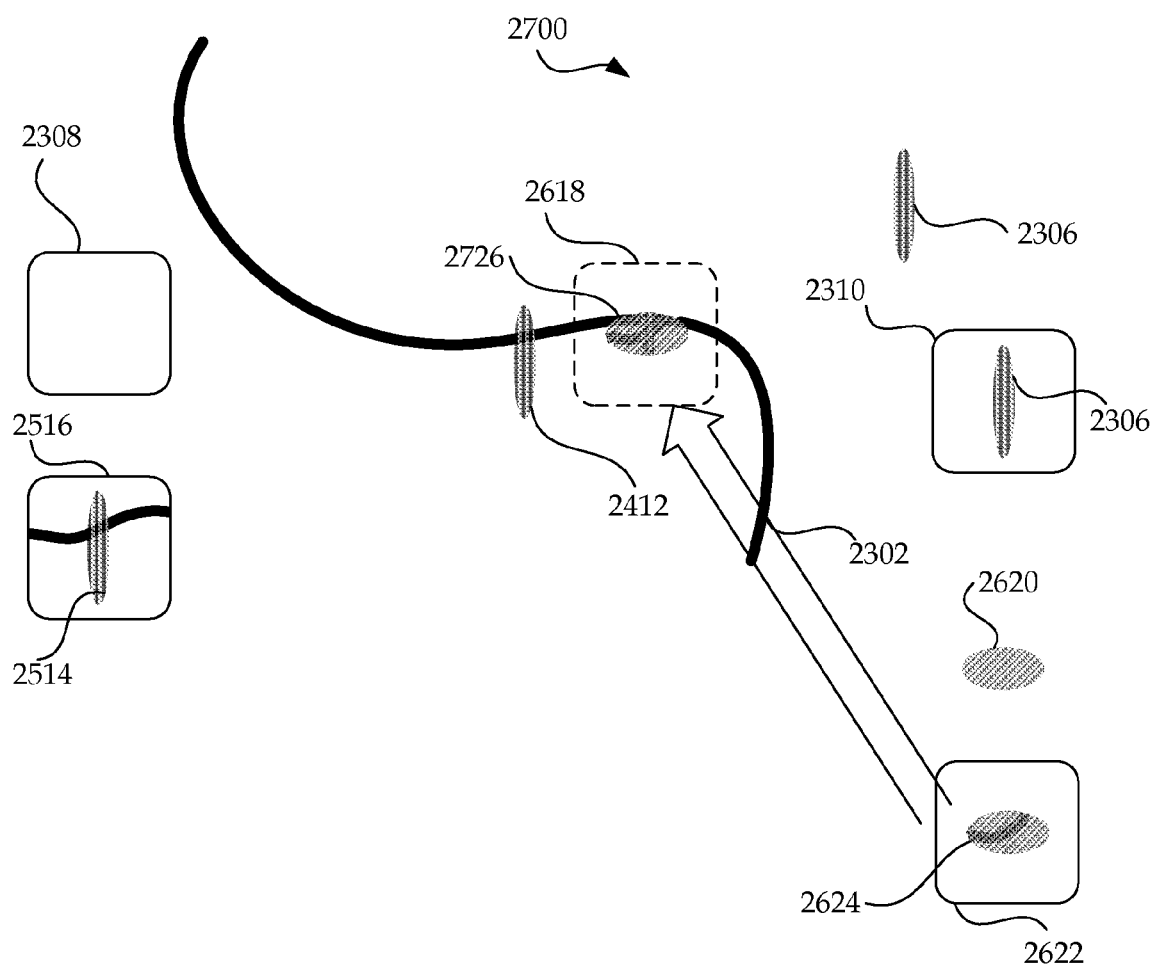
FIG. 27 is a schematic of an example graphics design application and display of a painting of the paint pickup method of FIG. 22.

At the determined stamp location, the color attributes from the paint data store may be applied or painted 2218 on the target surface, without the use of a stamp mask. Referring to the example schematic display 2700 of FIG. 27, the color attributes 2624 of the paint data store 2622 may be used to paint pixels at the stamp location 2618, and are shown as a plurality of semi-transparent pixels 2726 in the shape of an oval.

Figure 28:
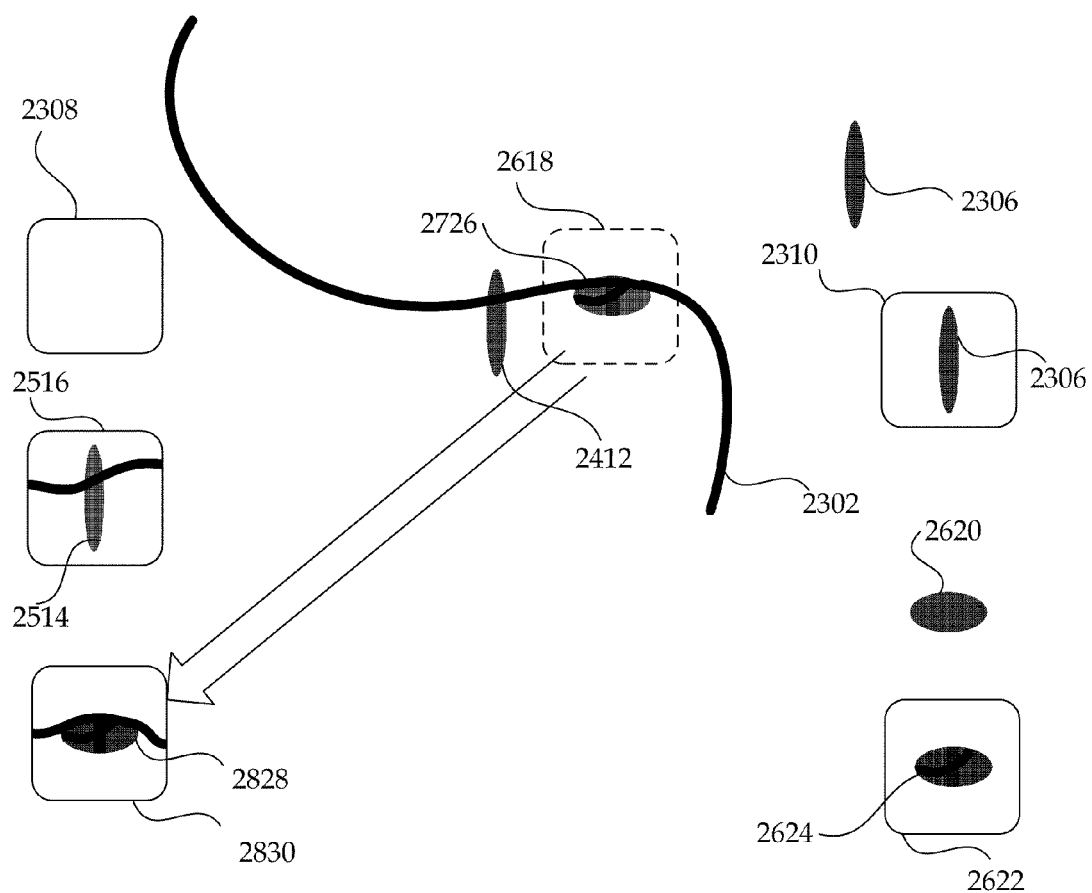
FIG. 28 is a schematic of an example graphics design application and display of a copy back of the dynamic paint pickup method of FIG. 22.

A pickup mask may be used to pickup 2220 one or more pixels proximate the determined stamp position to copy a portion of the pickup surface. The copied pixels may be stored 2222 in any suitable manner, such as in the pickup data store. The pickup mask may be determined in any suitable manner. As shown in the example schematic display of FIG. 28, the painted pixels 2726 and a portion of the existing pixels 2302 may be masked by the pickup mask at the determined stamp location 2618 to copy pixels 2828 to update the pickup data store 2830. If the graphics design application has received 2224 an indication of a pen up event, the method may end 2226.

While the many embodiments of the invention have been illustrated and described, it will be appreciated that various changes can be made therein without departing from the spirit and scope of the invention. For example, it is to be appreciated that any suitable data store in any suitable format may be used to store and/or communicate pixel data (e.g., paint data store, injection data store, pickup data store, etc.), including a relational database, object-oriented database, unstructured database, an in-memory database, or other data store. A storage array may be constructed using a flat file system such as ACSII text, a binary file, data transmitted across a communication network, or any other file system. Notwithstanding these possible implementations of the foregoing data stores, the term data store and storage array as used herein refer to any data that is collected and stored in any manner accessible by a computer. The examples above describe contaminating and re-injecting the injection color attributes at a stamp subsequent to the first stamp. It is to be appreciated that in some cases, all stamps after the first stamp may be contaminated and/or re-injected, and in other cases only a portion of the stamps subsequent to the first stamp may be contaminated and/or re-injected. The frequency or timing of the contamination and/or re-injection may be a default value or may be pre-defined by the user, which may be in accordance with an algorithm, e.g., randomly, periodically, in response to the amount of injection color painted at a stamp, some input from the user device (such as speed of movement or pressure), and the like.

The invention claimed is:

1. A method for dynamic paint pickup in manipulating a stroke on a target surface of a graphics document, the method implemented at least in part by a computing device comprising a processor, the method comprising:

determining an injection color attribute;

storing the injection color attribute in an injection data store;

copying one or more pixels from a pickup surface of the graphics document to a pickup data store, wherein the pickup surface contains pixels of a different graphics type than the target surface;

contaminating one or more of a plurality of color attributes of a paint data store with the pixels of the pickup data store;

injecting the injection color attribute into the plurality of color attributes of the paint data store, wherein the contaminating and the injecting are performed at a plurality of stamps in the stroke after a first stamp of the stroke;

determining a location of an individual stamp in the stroke for a graphics design manipulation tool; and painting the one or more pixels at the determined location of the target surface based on color attributes from the contaminated and injected paint data store;

wherein the determining an injection color attribute, storing, copying, contaminating, injecting, determining a location of a stamp, and painting are performed at least in part by the processor.

2. The method of claim 1, wherein the pickup surface includes the target surface, and wherein the method comprises repeating the copying, contaminating, injecting, determining and painting along the stroke.

3. The method of claim 1, wherein the copying includes using a pickup mask to determine which pixels to copy.

4. The method of claim 3, wherein the painting includes using a painting mask, different from the pickup mask.

5. The method of claim 1, wherein the injection color attribute varies over a length of the stroke.

6. The method of claim 1, wherein the contaminating includes combining the color attributes of pixels of the paint data store with color attributes of pixels of the pickup data store.

7. The method of claim 6, wherein the combining includes receiving an indication of a mixture value, and mixing the color attributes of the paint data store with color attributes of pixels of the pickup data store based at least in part on the mixture value.

8. The method of claim 7, wherein the mixing includes performing a weighted sum of the color attributes of the pixels of the paint data store with the pixels of the pickup data store, where a weight of the weighted sum is based on the mixture value.

9. The method of claim 7, wherein the mixture value is an indicated percentage of a mixture.

10. The method of claim 7, wherein the mixture value is based at least in part on an input from a user input device generating a trail of the stroke.

11. The method of claim 6, wherein the contaminating includes combining transparency properties of pixels of the paint data store with transparency properties of pixels of the pickup data store.

12. The method of claim 1, wherein the contaminating and the injecting are achieved together.

13. The method of claim 1, wherein the contaminating and the injecting are performed at each stamp in the stroke after the first stamp.

14. A graphics design system comprising:
a) a data store for storing color attribute information;
b) a memory in which machine instructions of a graphics design application are stored; and
c) a processor that is coupled to the memory and the data store, the processor being configured to execute the machine instructions of the graphics design application to carry out a plurality of functions for generating a stroke on a target surface, the functions including:
 i) copying pixels from a target surface;
 ii) contaminating a paint data store containing an injection color attribute with the pixels from the target surface based at least in part on a mixture value, wherein the mixture value is an indicated percentage of mixture;
 iii) injecting the injection color attribute into the paint data store, wherein the contaminating and the injecting are achieved together; and
 iv) painting a stamp of the stroke based on the paint data store.

15. The graphics design system of claim 14, wherein the machine instructions include instructions that when executed by the processor during performance of the contaminating function, cause the processor to consider the mixture value; and wherein the machine instructions include instructions for repeating the functions of copying, contaminating, injecting, and painting during generation of the stroke.

16. One or more non-transitory computer readable storage media having computer executable components stored thereon, that when executed, perform acts comprising:

determining an injection color attribute;

storing the injection color attribute in an injection data store;

copying one or more pixels from a pickup surface of a document to a pickup data store;

contaminating one or more of a plurality of color attributes of a paint data store with the pixels of the pickup data store, wherein the contaminating includes combining the color attributes of pixels of the paint data store with color attributes of pixels of the pickup data store, and wherein the combining includes:
 receiving an indication of a mixture value comprising an indicated percentage of a mixture; and
 mixing the color attributes of the paint data store with color attributes of pixels of the pickup data store based at least in part on the mixture value;

injecting the injection color attribute into the plurality of color attributes of the paint data store, wherein the contaminating and the injecting are performed at a plurality of stamps in a stroke on a target surface of the document after a first stamp of the stroke;

determining a location of an individual stamp in the stroke; and painting the one or more pixels at the determined location based on individual color attributes from the contaminated and injected paint data store.

17. The one or more non-transitory computer readable storage media of claim 16, wherein the pickup surface includes the target surface.

18. The one or more non-transitory computer readable storage media of claim 16, wherein the pickup surface contains pixels of a different graphics type than the target surface.

* * * * *